(12) United States Patent
Williams et al.

(10) Patent No.: US 9,546,276 B2
(45) Date of Patent: Jan. 17, 2017

(54) BIO-OIL FORMULATION AS AN ASPHALT SUBSTITUTE

(71) Applicant: Iowa State University Research Foundation, Inc., Ames, IA (US)

(72) Inventors: Ronald Christopher Williams, Ames, IA (US); Mohamed Abdel Raouf Mohamed Metwally, Cairo (EG); Robert C. Brown, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 14/921,153

(22) Filed: Oct. 23, 2015

(65) Prior Publication Data

US 2016/0040012 A1    Feb. 11, 2016

Related U.S. Application Data

(62) Division of application No. 13/149,183, filed on May 31, 2011, now Pat. No. 9,200,161.

(60) Provisional application No. 61/350,199, filed on Jun. 1, 2010.

(51) Int. Cl.
| | |
|---|---|
| *C08L 95/00* | (2006.01) |
| *C08L 23/06* | (2006.01) |
| *C08L 23/30* | (2006.01) |

(52) U.S. Cl.
CPC ............... *C08L 95/00* (2013.01); *C08L 23/06* (2013.01); *C08L 23/30* (2013.01); *C08L 2555/62* (2013.01)

(58) Field of Classification Search
CPC ........... C08L 95/00; C08L 23/06; C08L 23/30; C08L 2555/62
See application file for complete search history.

(56) References Cited

U.S. PATENT DOCUMENTS

| | | |
|---|---|---|
| 695,423 A | 3/1902 | Warren |
| 4,717,614 A | 1/1988 | Bondoc et al. |
| 5,021,476 A | 6/1991 | Pinomaa |
| 5,656,733 A | 8/1997 | Suchanec |
| 5,668,197 A | 9/1997 | Schilling |
| 5,744,524 A | 4/1998 | Manandhar et al. |
| 5,916,826 A | 6/1999 | White |
| 6,512,090 B1 | 1/2003 | Suchanec et al. |
| 6,706,787 B1 | 3/2004 | Burris et al. |
| 6,844,420 B1 | 1/2005 | Freel et al. |

(Continued)

FOREIGN PATENT DOCUMENTS

WO    2010/033512 A1    3/2010

OTHER PUBLICATIONS

Sorensen, A., "Asphalt and Bitumen," Ullmann's Encyclopedia of Industrial Chemistry, published online 2009, vol. 4, 273-294.*

(Continued)

*Primary Examiner* — Liam J Heincer
*Assistant Examiner* — Nicholas Hill
(74) *Attorney, Agent, or Firm* — LeClairRyan, a Professional Corporation

(57) ABSTRACT

A bio-oil formulation, useful as an asphalt binder substitute in pavement and roofing shingles, includes bio-oil and a polymer additive. The bio-oil binder can include an asphalt additive. The bio-oil binder can be emulsified with water and a surfactant for use as a weatherproofing sealant or as an adhesive. A method for making the bio-oil binder is disclosed.

14 Claims, 18 Drawing Sheets

(56) References Cited

U.S. PATENT DOCUMENTS

| | | | |
|---|---|---|---|
| 8,100,990 | B2 | 1/2012 | Ellens et al. |
| 9,200,161 | B2* | 12/2015 | Williams ............... C08L 23/06 |
| 2003/0212168 | A1 | 11/2003 | White et al. |
| 2004/0260057 | A1 | 12/2004 | Michel |
| 2008/0006178 | A1 | 1/2008 | Michel |
| 2010/0275817 | A1 | 11/2010 | Williams et al. |
| 2014/0200291 | A1 | 7/2014 | Williams et al. |

OTHER PUBLICATIONS

Farag et al., "Final Report: Technical, Environmental and Economic Feasibility of Bio-Oil in New Hampshire's North Country," New Hampshire Industrial Research Center (Dec. 15, 2001 to Aug. 31, 2002).

Raouf et al., "Temperature and Shear Susceptibility of a Non-Petroleum Binder as a Pavement Material," 89th Annual Meeting of the Transportation Research Board, Washington, D.C. (Jan. 10-14, 2010) (16 pages).

Raouf et al., "General Rheological Properties of Fractionated Switchgrass Bio-Oil as a Pavement Material," Road Materials and Pavement Design 11:325-353 (2010).

Raouf et al., "Determination of Pre-Treatment Procedure Required for Developing Bio-Binders from Bio-Oils," Proceedings of the 2009 Mid-Continent Transportation Research Symposium, Ames, IA (Aug. 2009) (13 pages).

Raouf et al., "Rheology of Fractionated Cornstover Bio-Oil as a Pavement Material," 2nd International Conference on Transport Infrastructures, Sao Paulo, Brazil (Aug. 4-6, 2010) (20 pages).

Raouf, M., "Development of Non-Petroleum Binders Derived From Fast Pyrolysis Bio-Oils for Use in Flexible Pavement," Iowa State University (Nov. 17, 2010) (324 pages).

Williams et al., "Engineering a Non-Petroleum Binder for Use in Flexible Pavements," Peterson Asphalt Conference (Jul. 10, 2009) (28 pages).

Raouf et al., "Temperature Susceptibility of Non Petroleum Binders Derived from Bio-Oils," 7th Asia Pacific Conference on Transportation and the Environment, Semarang, Indonesia (Jun. 3-5, 2010) (10 pages).

International Search Report and Written Opinion for International Patent Application PCT/US2011/038577 (mailed Jan. 19, 2012).

Mohan et al., "Pyrolysis of Wood/Biomass for Bio-Oil: A Critical Review," Energy and Fuels 20:848-889 (2006).

Tang et al., "Antioxidant Effect of Bio-Oil Additive ESP on Asphalt Binder," Proceedings of the 2009 Mid-Continent Transportation Research Symposium, Ames, Iowa (Aug. 2009) (14 pages).

Williams, C., "Asphalt Paving, Bio Buzzword," Roads & Bridges (www.roadsbridges.com) pp. 34-37 (Sep. 2009).

Williams et al., "Utilization of Fractionated Bio Oil in Asphalt," Transportation Research Board 88th Annual Meeting, Washington, D.C. (Jan. 11-15, 2009) (19 pages).

Williams et al., "Utilization of Bio-Oil Fractions as an Asphalt Additive," Oral Presentation, Petersen Asphalt Conference, Laramie, Wyoming (Jul. 15, 2008) (26 pages).

Williams et al., "Utilization of Bio-Oil Fractions as an Antioxidant Asphalt Additive," Oral Presentation, BIT 1st Annual World Congress of iBio, Hangzhou, China (May 20, 2008) (34 pages).

Williams et al., "Utilization of Bio-Oil Fractions as an Asphalt Additive," Oral Presentation, Growing the Bioeconomy from Foundational Science to Sustainable Practice, Iowa State University, Ames, Iowa (Sep. 9, 2008) (28 pages).

Office Action dated Jul. 23, 2012 for U.S. Appl. No. 12/772,945.

Office Action dated Jun. 3, 2013 for U.S. Appl. No. 12/772,945.

Garcia et al., "Roofing Materials," Kirk-Othmer Encyclopedia of Chemical Technology, pp. 1-20 (published online Dec. 4, 2000).

Tate et al., "The Viscosities of Three Biodiesel Fuels at Temperatures up to 300 Degrees C," Fuel 85:1010-1015 (2006).

Sorensen et al., "Asphalt and Bitumen," Ullmann's Encyclopedia of Industrial Chemistry 4:273-294 (Oct. 15, 2009).

Kandhal et al., "Asphalt Viscosity-Related Properties of In-Service Pavements in Pennsylvania," in Viscosity Testing of Asphalt and Experience with Viscosity Graded Specifications, A Symposium Presented at the 75th Annual Meeting of the American Society for Testing and Materials, Los Angeles, California 532:70 and 77 (1972).

Qi et al., "Review of Biomass Pyrolysis Oil Properties and Upgrading Research," Energy Conversion and Management 48:87-92 (2007).

Office Action dated Nov. 6, 2015 for U.S. Appl. No. 14/216,000.

Final Office Action for U.S. Appl. No. 14/216,000 (May 19, 2016).

* cited by examiner

BIO-OIL FORMULATION AS AN ASPHALT SUBSTITUTE

This application is a divisional application of U.S. patent application Ser. No. 13/149,183, filed May 31, 2011, and claims the benefit of U.S. Provisional Patent Application Ser. No. 61/350,199, filed Jun. 1, 2010, which are hereby incorporated by reference in its entirety.

FIELD OF THE INVENTION

The invention relates to the use of a bio-oil formulation as an asphalt substitute. In particular, the invention relates to the use of bio-oil formulations as replacement for asphalt binders in various applications, and methods for the production thereof.

BACKGROUND OF THE INVENTION

Asphalt or flexible pavement is typically built with several layers to form a layered system with better materials at the top where the stress intensity is high and inferior materials at the bottom where the stress intensity is low. The top layer, called the surface course, is typically made of an asphalt mixture. All types of failure or distress can be classified by whether they are structural or functional failures and load associated or non-load associated distresses.

Most bituminous adhesives or binders that are used for pavement materials are derived primarily from fossil fuels. Nevertheless, with petroleum oil reserves becoming depleted and the subsequent urge to reduce fossil fuel usage, there is a drive to develop and produce binders from alternative sources, particularly from biorenewable resources. Over the years, biorenewable natural resources including sugars, triglyceride oils and proteins have been tested as alternative sources for producing adhesives and binders. For example, adhesives derived from soy protein, starch, cellulose and other polysaccharides have been extensively used for adherents such as wood, paper, plastic, metal, leather and glass. Due to the availability of large quantities of biorenewable sources such as triglyceride oils, proteins, starch and other carbohydrates from different botanical sources, there are virtuous technical and economic prospects in utilizing them to produce bio-binders.

Recently, through the application of scientific research and development, a range of different vegetable oils have been investigated to determine their physical and chemical properties to study their applicability to be used as bio-binders in the pavement industry. Applicants have found this development to be useful in overcoming the deficiencies in the art.

SUMMARY OF THE INVENTION

One aspect of the present invention is directed to a composite material that includes a mineral aggregate and a bio-oil binder. The bio-oil binder contains bio-oil and a polymer additive.

Another aspect of the present invention relates to an asphalt binder substitute containing a bio-oil binder which includes bio-oil and a polymer additive.

A further aspect of the present invention relates to a method for the production of an asphalt binder substitute. This method includes pretreating a bio-oil by mechanical mixing at a temperature of from about 100° C. to about 130° C. As a result, the bio-oil achieves a viscosity of less than about 3 Pa·s at a temperature of from about 100° C. to about 130° C. and is equivalent to the bio-oil being mixed at a temperature of from about 100° C. to about 130° C. This gives the bio-oil an aging index of less than about 12 after from about 2 to about 8 hours. A polymer additive is then added to the pretreated bio-oil, and the blend is heated at a temperature of from about 100° C. to about 130° C. The heated blend is then treated to a viscosity between about 100 and about 1000 cps when measured in a rotational viscometer at about 20 rpm and a temperature of from about 100° C. to about 130° C.

The benefits of this technology include a low cost asphalt binder substitute that performs as well as asphalt binders currently being used. Further, the bio-oil binder likely lowers hot mix asphalt plant production temperatures, and thus reduces plant emissions. Lastly, the bio-oil binder represents the development of green materials/technologies that are renewable, and lessen the reliance on foreign crude oil.

The conversion of residual biomass such as corn stover or forest products provides added economic opportunity for property owners over that of the crops being harvested, and used in fast pyrolysis to produce materials that can be used in lieu of asphalt. The bio-oil can also be used in combination with ground recycled tire rubber to enhance the low temperature elastic properties of the combined binder.

DETAILED DESCRIPTION OF THE INVENTION

Figure 1:
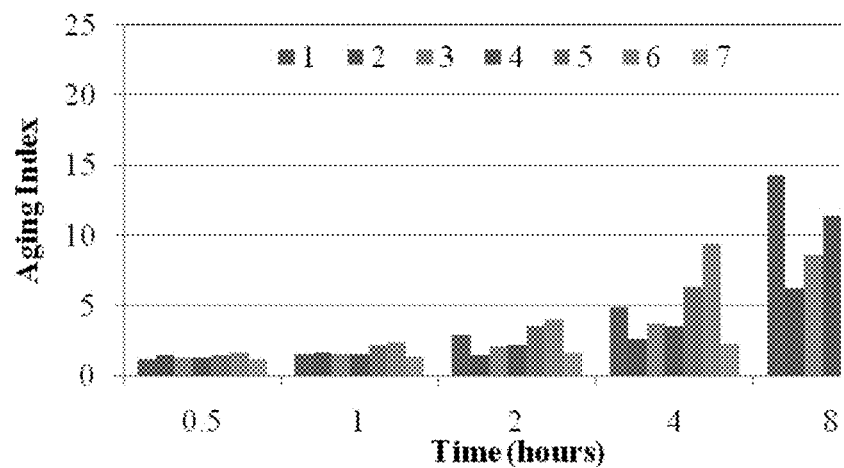
FIG. 1 is a plot of aging index relative to zero hours for oakwood blends before treatment at 125° C.
Figure 2:
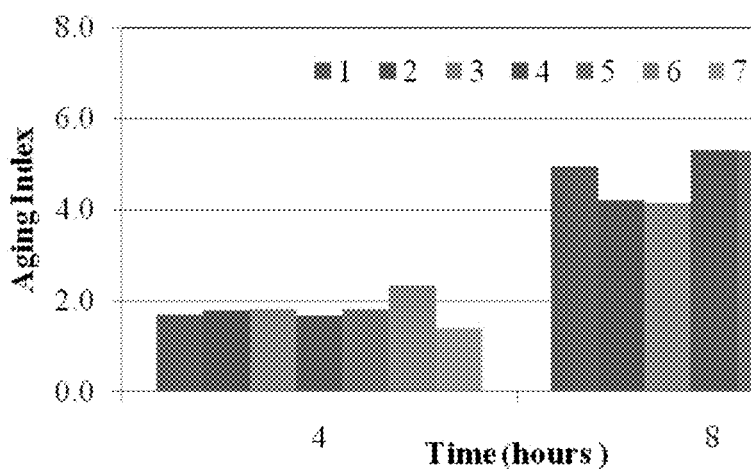
FIG. 2 is a plot of aging index relative to two hours for oakwood blends before treatment at 125° C.
Figure 3:
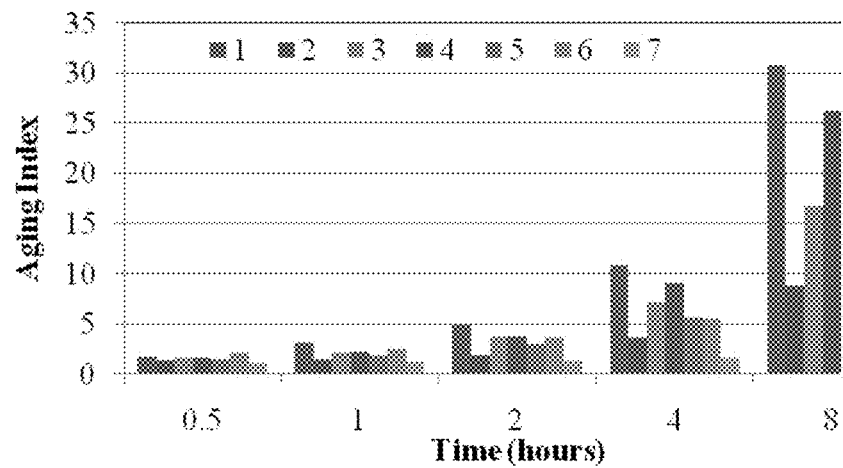
FIG. 3 is a plot of aging index relative to zero hours for oakwood blends before treatment at 135° C.
Figure 4:
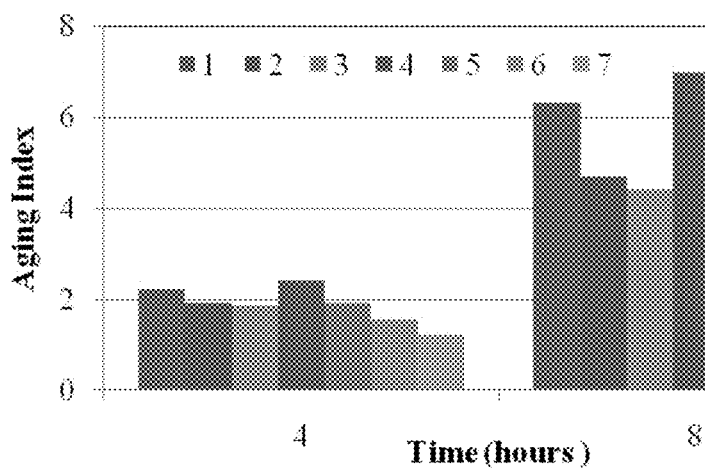
FIG. 4 is a plot of aging index relative to two hours for oakwood blends before treatment at 135° C.
Figure 5:
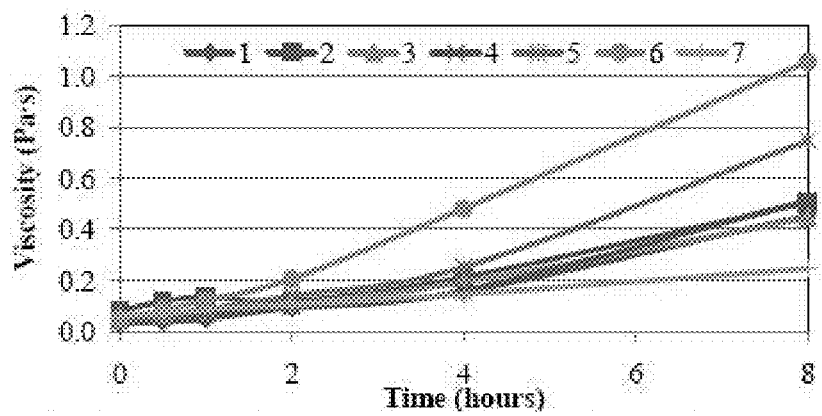
FIG. 5 is a plot of viscosity over time for oakwood blends before treatment at 125° C.
Figure 6:
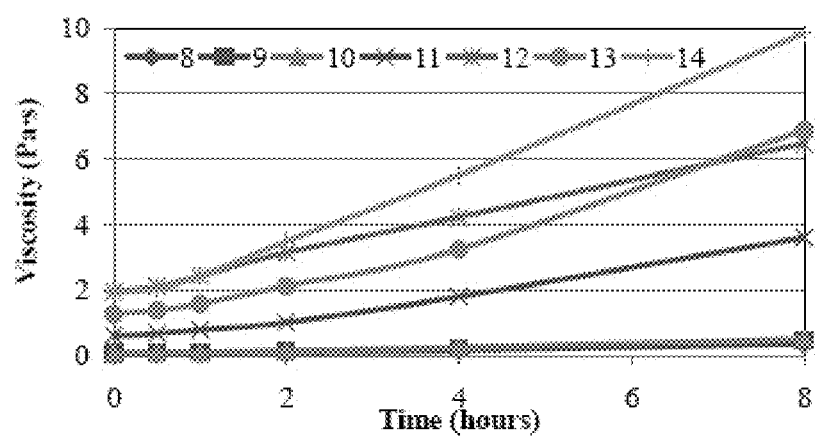
FIG. 6 is a plot of viscosity over time for switchgrass blends before treatment at 125° C.
Figure 7:
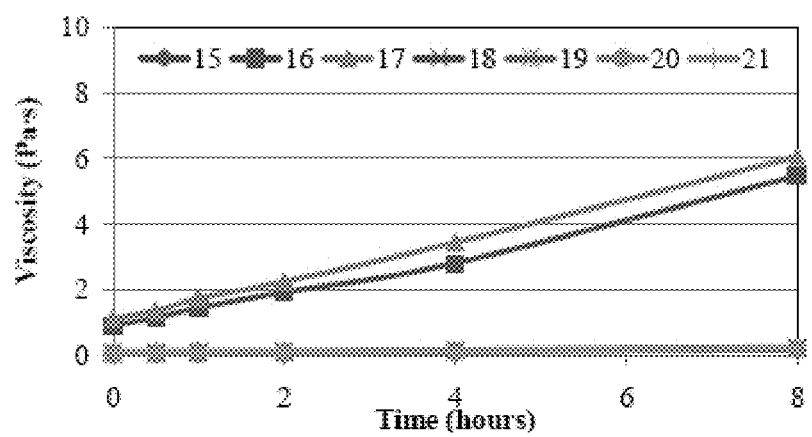
FIG. 7 is a plot of viscosity over time for cornstover blends before treatment at 125° C.
Figure 8:
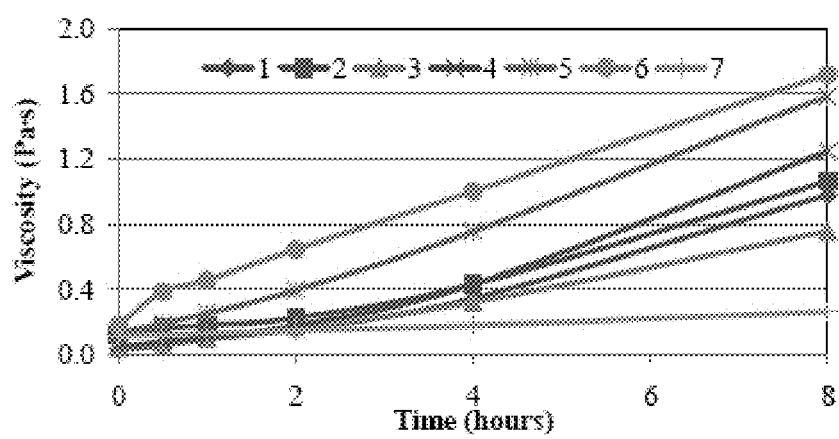
FIG. 8 is a plot of viscosity over time for oakwood blends before treatment at 135° C.
Figure 9:
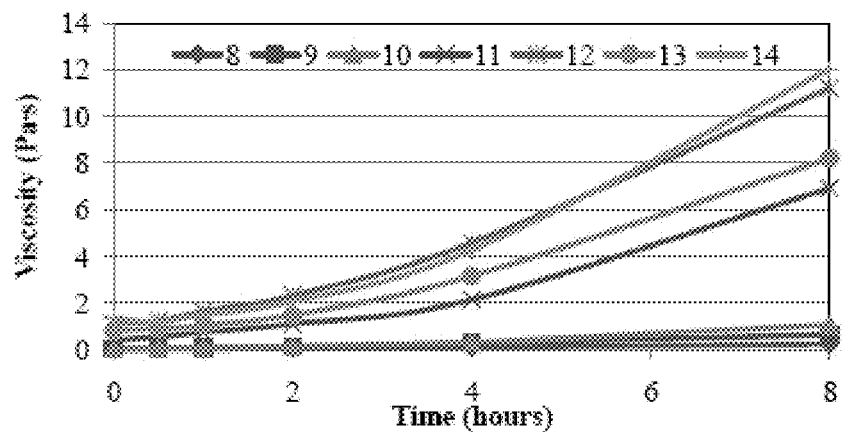
FIG. 9 is a plot of viscosity over time for switchgrass blends before treatment at 135° C.
Figure 10:
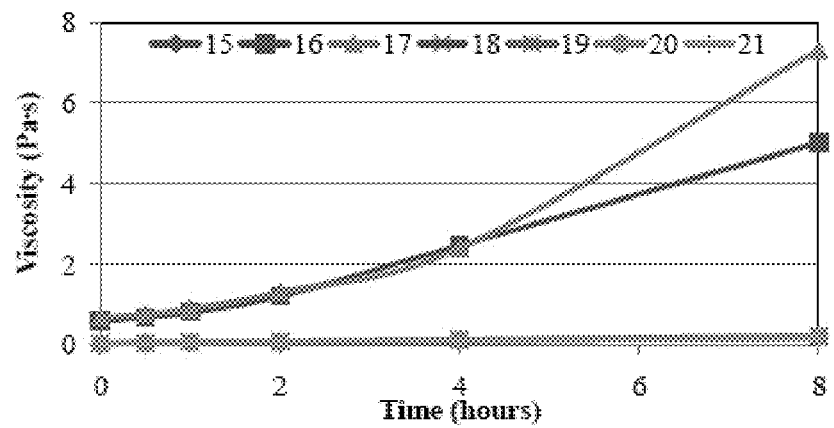
FIG. 10 is a plot of viscosity over time for cornstover blends before treatment at 135° C.
Figure 11:
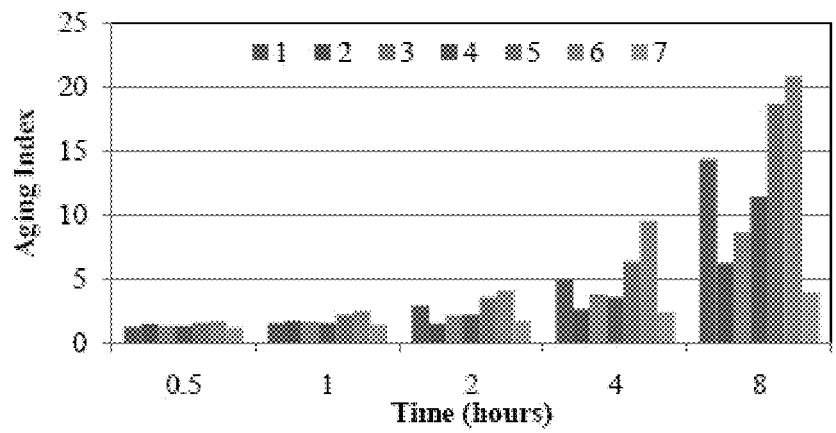
FIG. 11 is a plot of aging index relative to zero hours for oakwood blends before treatment at 125° C.
Figure 12:
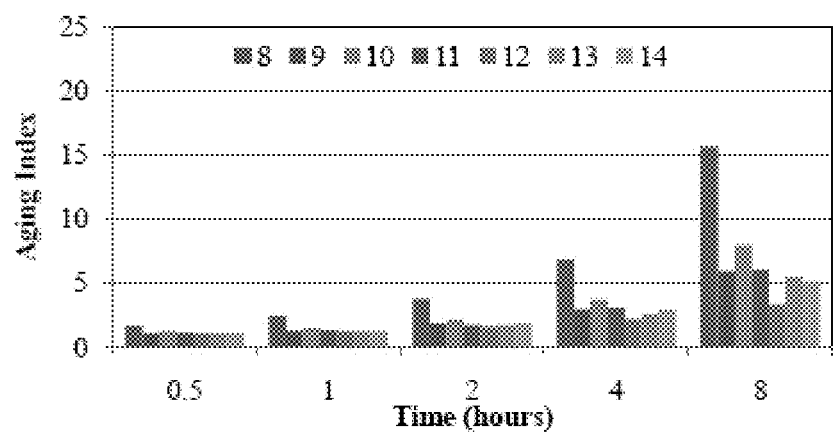
FIG. 12 is a plot of aging index relative to zero hours for switchgrass blends before treatment at 125° C.
Figure 13:
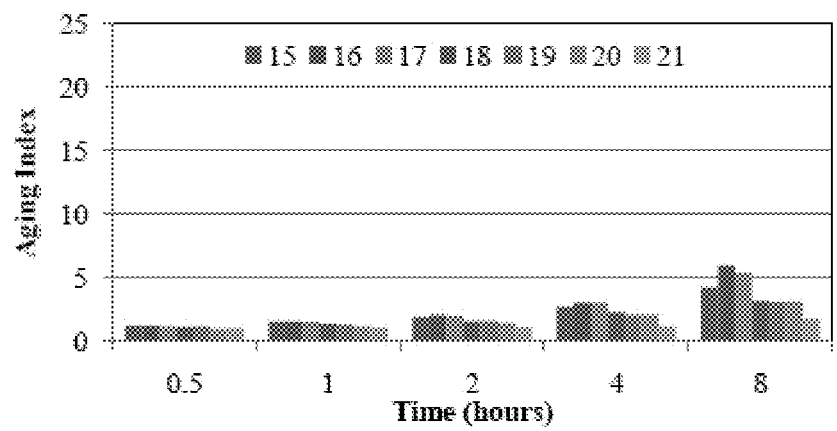
FIG. 13 is a plot of aging index relative to zero hours for cornstover blends before treatment at 125° C.
Figure 14:
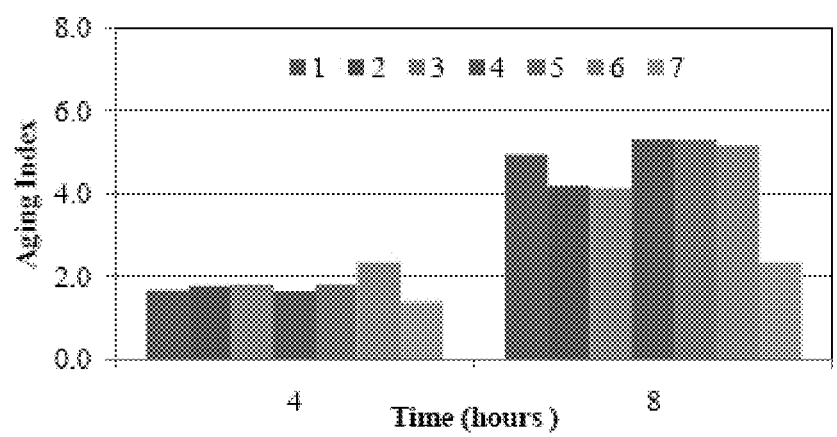
FIG. 14 is a plot of aging index relative to two hours for oakwood blends before treatment at 125° C.
Figure 15:
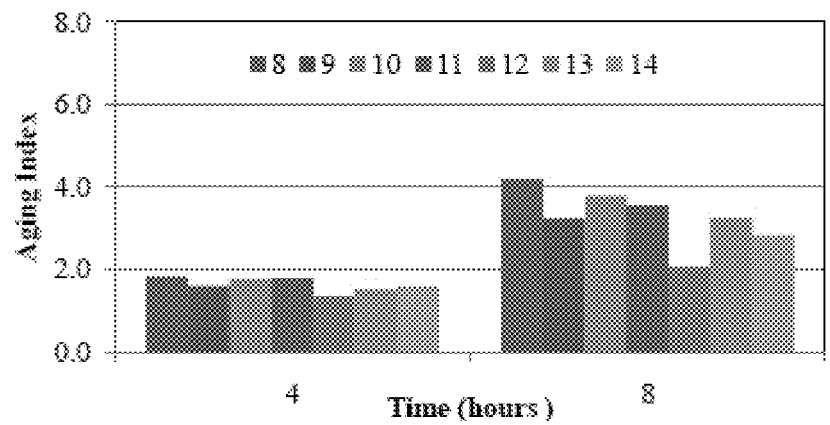
FIG. 15 is a plot of aging index relative to two hours for switchgrass blends before treatment at 125° C.
Figure 16:
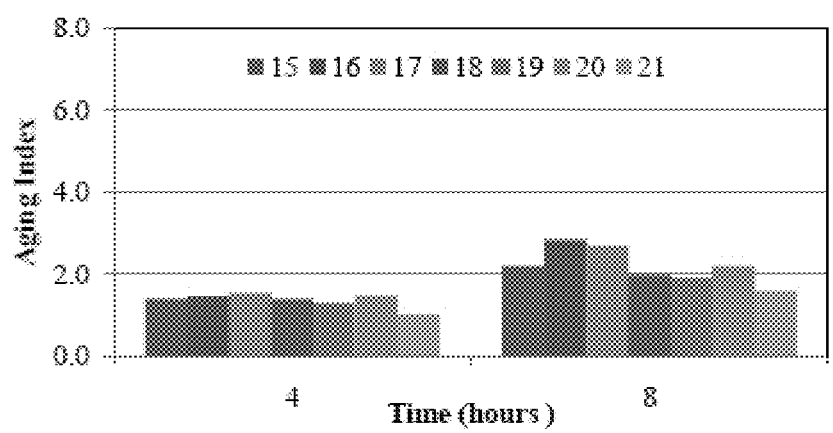
FIG. 16 is a plot of aging index relative to two hours for cornstover blends before treatment at 125° C.
Figure 17:
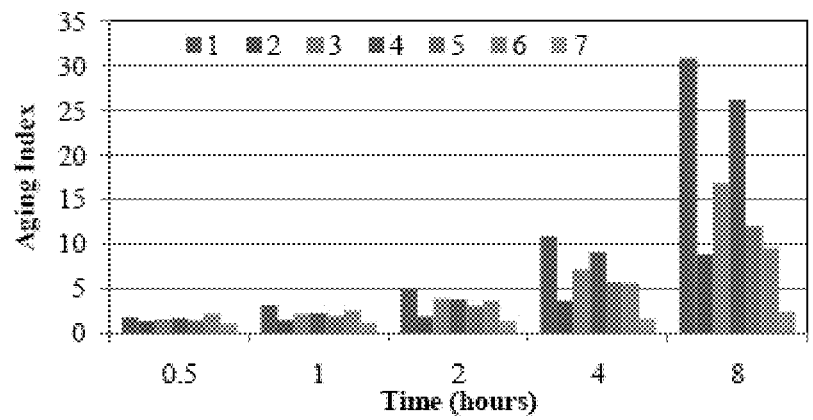
FIG. 17 is a plot of aging index relative to zero hours for oakwood blends before treatment at 135° C.
Figure 18:
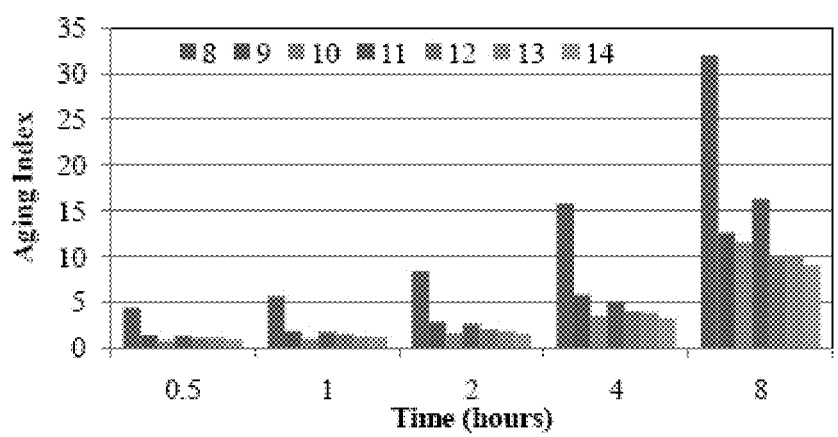
FIG. 18 is a plot of aging index relative to zero hours for switchgrass blends before treatment at 135° C.
Figure 19:
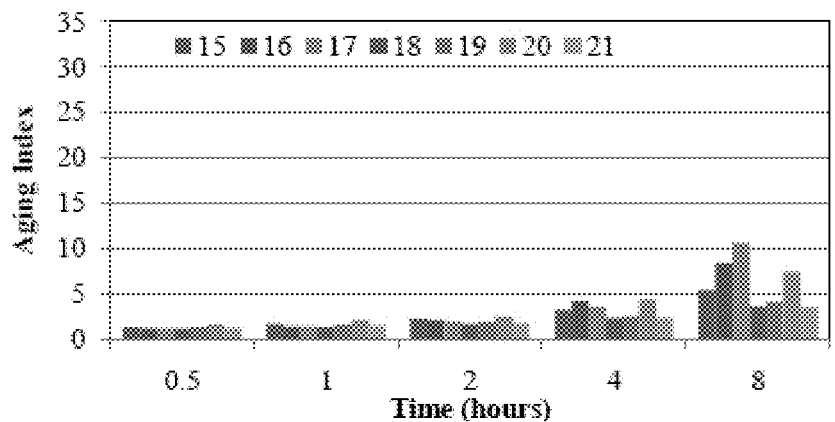
FIG. 19 is a plot of aging index relative to zero hours for cornstover blends before treatment at 135° C.
Figure 20:
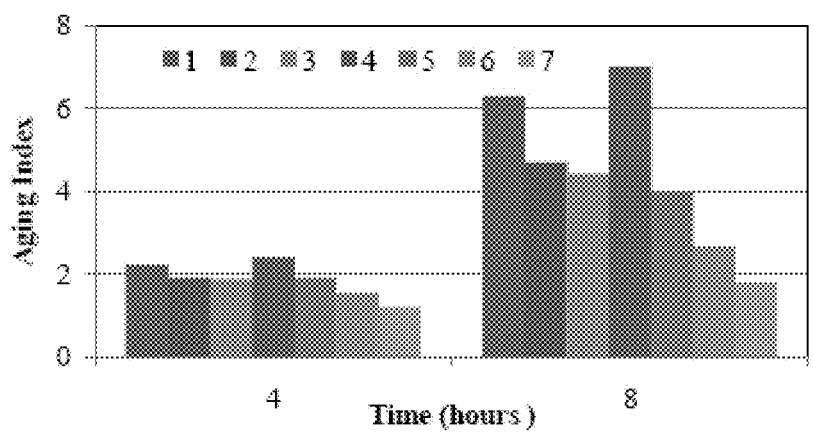
FIG. 20 is a plot of aging index relative to two hours for oakwood blends before treatment at 135° C.
Figure 21:
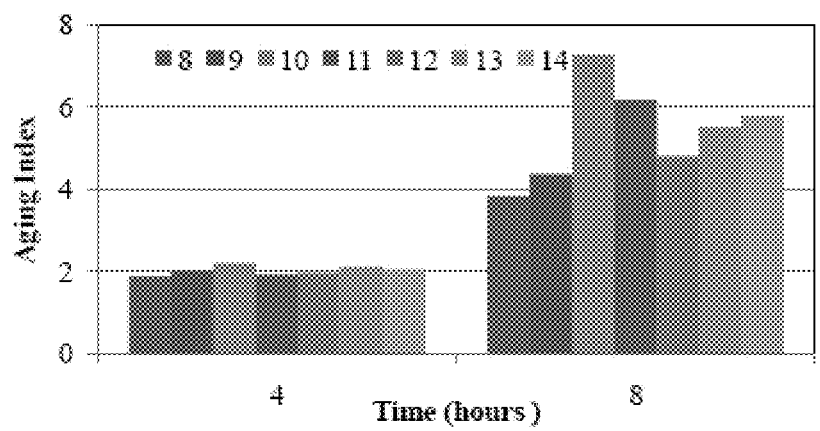
FIG. 21 is a plot of aging index relative to two hours for switchgrass blends before treatment at 135° C.
Figure 22:
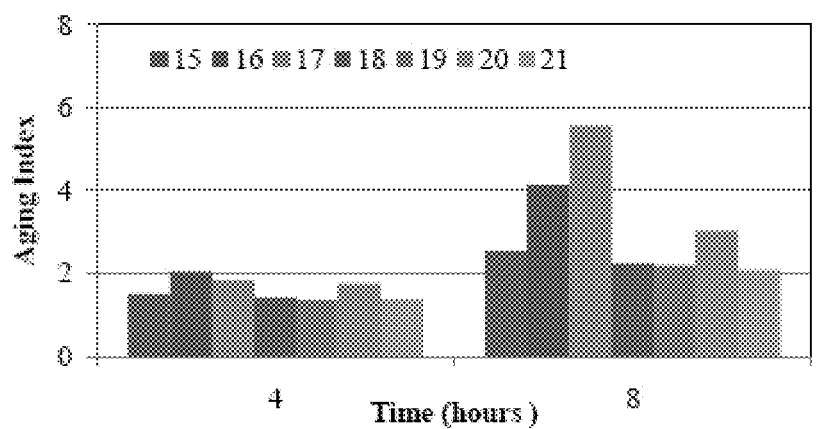
FIG. 22 is a plot of aging index relative to two hours for cornstover blends before treatment at 135° C.
Figure 23:
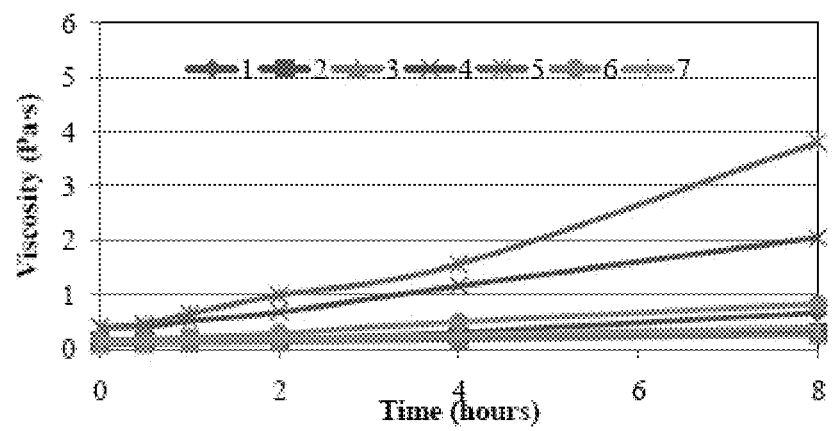
FIG. 23 is a plot of viscosity over time for oakwood blends after treatment at 125° C.
Figure 24:
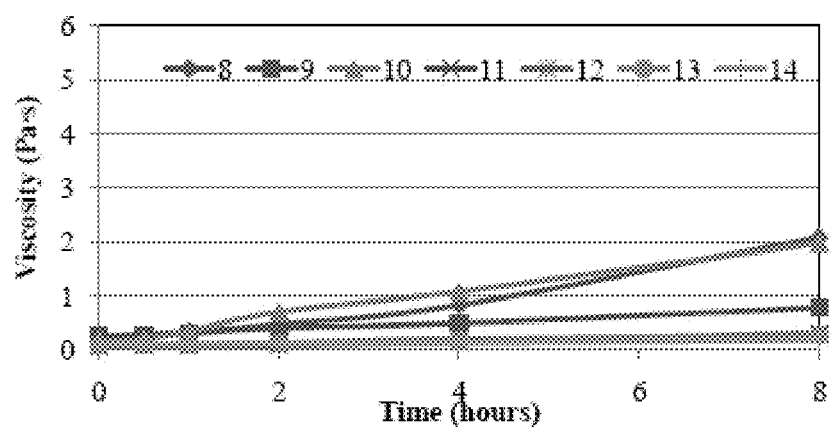
FIG. 24 is a plot of viscosity over time for switchgrass blends after treatment at 125° C.
Figure 25:
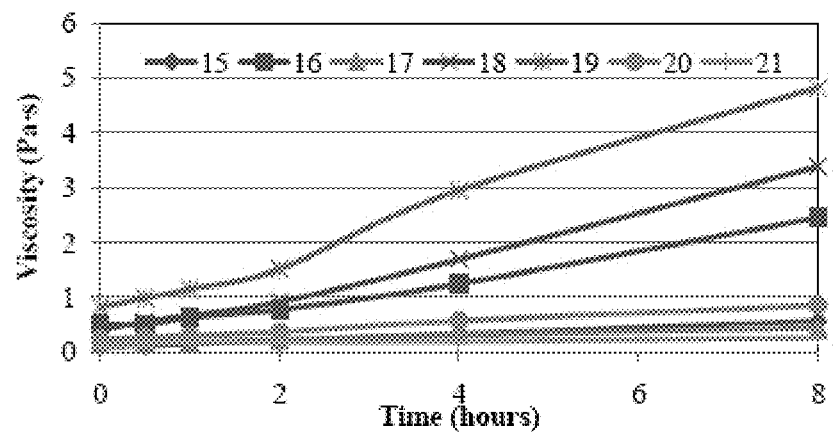
FIG. 25 is a plot of viscosity over time for cornstover blends after treatment at 125° C.
Figure 26:
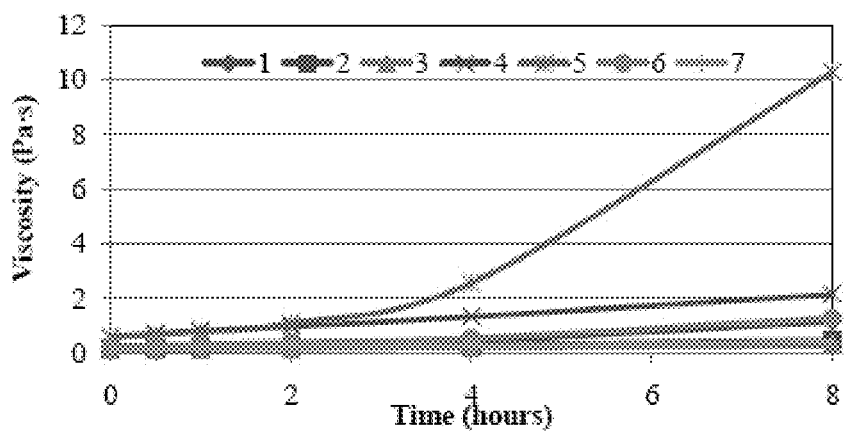
FIG. 26 is a plot of viscosity over time for oakwood blends after treatment at 135° C.
Figure 27:
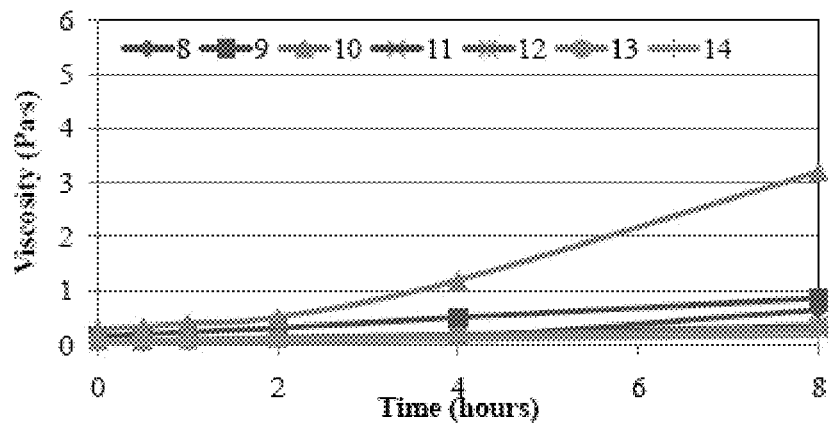
FIG. 27 is a plot of viscosity over time for switchgrass blends after treatment at 135° C.
Figure 28:
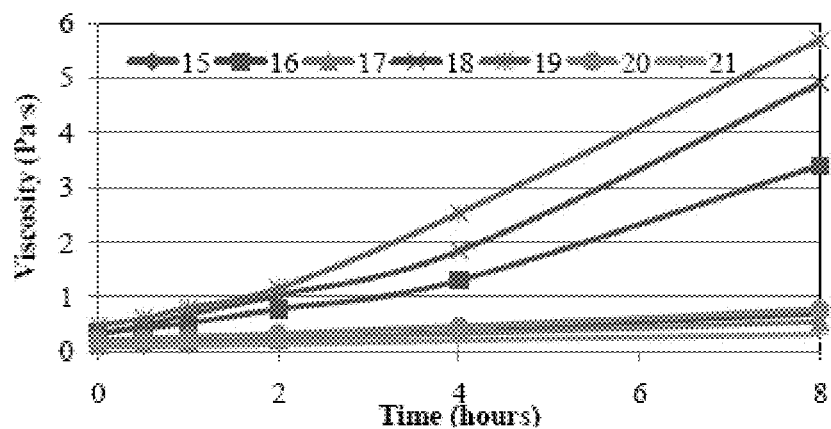
FIG. 28 is a plot of viscosity over time for cornstover blends after treatment at 135° C.
Figure 29:
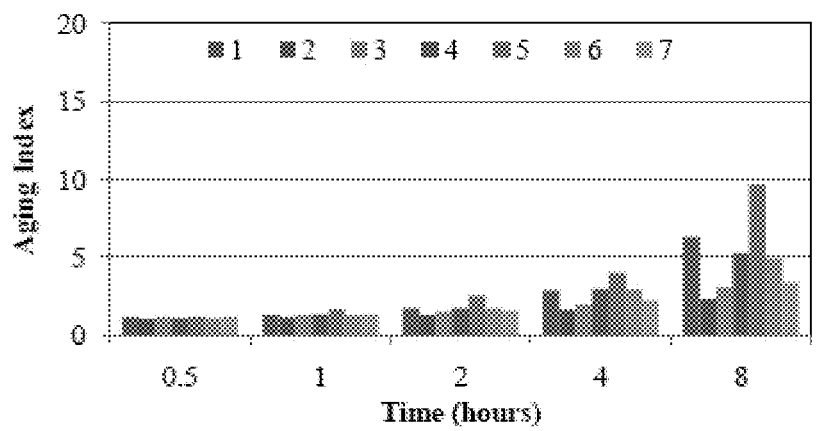
FIG. 29 is a plot of aging index relative to zero hours for oakwood blends after treatment at 125° C.
Figure 30:
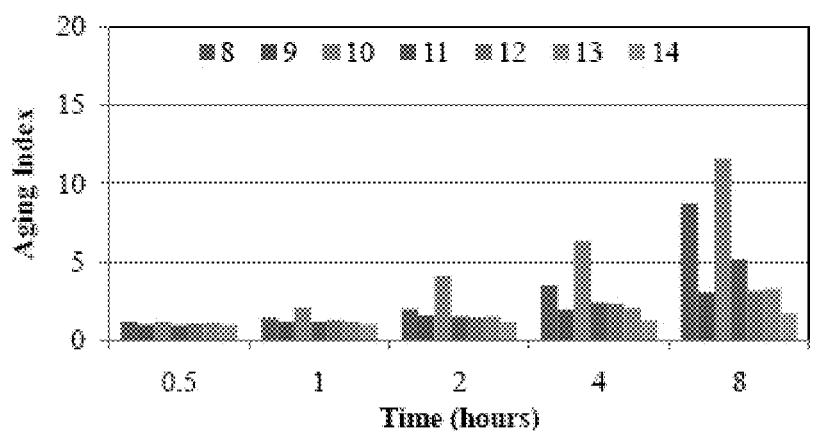
FIG. 30 is a plot of aging index relative to zero hours for switchgrass blends after treatment at 125° C.
Figure 31:
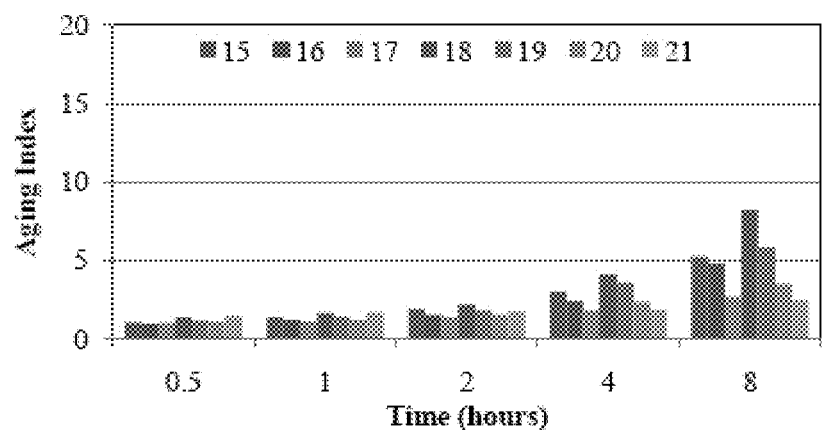
FIG. 31 is a plot of aging index relative to zero hours for cornstover blends after treatment at 125° C.
Figure 32:
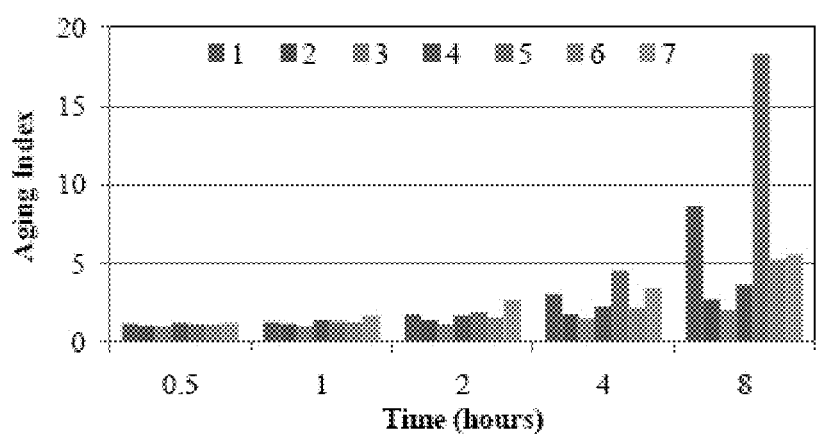
FIG. 32 is a plot of aging index relative to zero hours for oakwood blends after treatment at 135° C.
Figure 33:
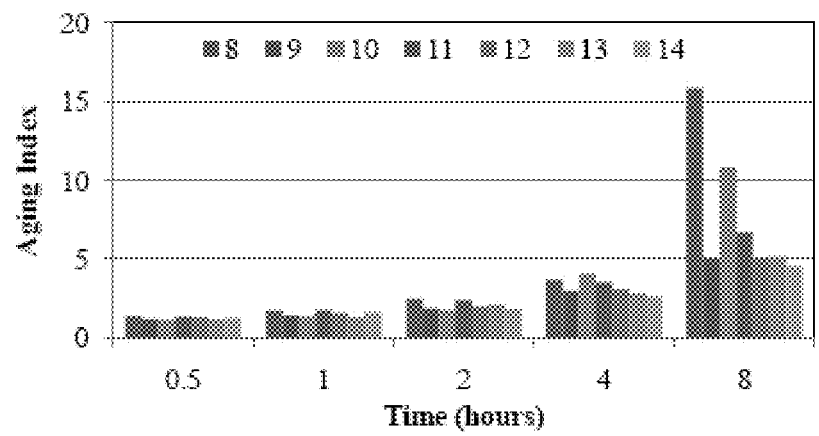
FIG. 33 is a plot of aging index relative to zero hours for switchgrass blends after treatment at 135° C.
Figure 34:
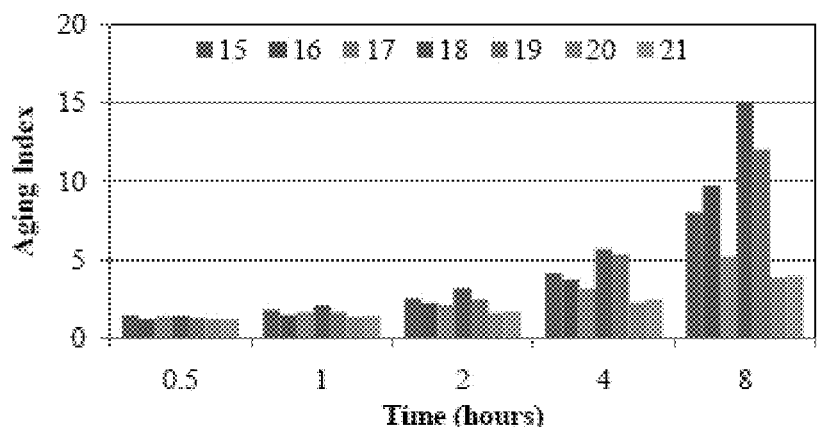
FIG. 34 is a plot of aging index relative to zero hours for cornstover blends after treatment at 135° C.

One aspect of the present invention is directed to a composite material that includes a mineral aggregate and a bio-oil binder. The bio-oil binder contains bio-oil and a polymer additive.

Another aspect of the present invention relates to an asphalt binder substitute containing a bio-oil binder which includes bio-oil and a polymer additive.

A further aspect of the present invention relates to a method for the production of an asphalt binder substitute. This method includes pretreating a bio-oil by mechanical mixing at a temperature of from about 100° C. to about 130° C. As a result, the bio-oil achieves a viscosity of less than about 3 Pa·s at a temperature of from about 100° C. to about 130° C. and is equivalent to the bio-oil being mixed at a temperature of from about 100° C. to about 130° C. This gives the bio-oil an aging index of less than about 12 after from about 2 to about 8 hours. A polymer additive is then added to the pretreated bio-oil, and the blend is heated at a temperature of from about 100° C. to about 130° C. The heated blend is then treated to a viscosity between about 100 and about 1000 cps when measured in a rotational viscometer at about 20 rpm and a temperature of from about 100° C. to about 130° C.

Bio-oil produced from fast pyrolysis process of biomass provides a source of lignin-derived oligomers. One route to convert lignocellulosic biomass to produce chemicals and fuels that has gained serious attention more recently is a fast pyrolysis platform. Fast pyrolysis is the rapid thermal decomposition of organic compounds in the absence of oxygen to produce liquids, gases, and chars. The distribution of products depends on the biomass composition, particle size, and rate and duration of heating. Liquid yields as high as 78% are possible. The liquid product can substitute for fuel oil in static heating or electricity generation application.

In addition, the liquid can also be used to produce a range of specialty and commodity chemicals, such as levoglucosene, fertilizers, and hydrogen. Depending on its original lignocellulosic biomass source, bio-oil contains between 10 to 30% lignin-derived oligomers by weight.

In the fast pyrolysis process, biomass is heated rapidly in a high temperature environment, yielding a mix of liquid fuel (bio-oil), combustible gases, and solid char. Pyrolysis is an independent conversion technology, as well as a part of the gasification process. Gasification can be separated into two main stages: 1) solid devolatilization (pyrolysis) and 2) char conversion (combustion and gasification). Fast pyrolysis converts biomass into liquid form, which has higher bulk density and heating value, thus it is easier and more economical to store and/or transport compared to the bulky biomass. The liquid product resulting from biomass pyrolysis is commonly referred to as "pyrolysis oil," "bio-fuel oil," or simply "bio-oil."

One embodiment of a suitable bio-oil composition which is suitable for use in the present invention includes 0 to 2.1 wt % miscellaneous oxygenates, 0 to 0.85 wt % furans, 0.73 to 1.82 wt % phenols, 0.48 to 0.7 wt % guaiacols (i.e. methoxy phenols), 0.55 to 1.48 wt % syringols (i.e. dimethoxypenols), and 9.04 to 26.4 wt % sugars. Other materials present include ketones, alcohol, and acids.

Suitable miscellaneous oxygenates include hydroxyacetaldehyde, hydroxypropanone, and acetol.

Examples of useful ketones are 3-ethyl-2-hydroxy-2-cyclopentenone, acetoxyacetone, 2-methyl-2-cyclopentenone, 3-methyl-2-cyclopentenone, 1-hydroxy-2-butanone, 3-methyl-1,2-cyclopentanedione, 2-propanone, and 2H-Pyran-2-one.

Useful furans include 2-acetylfuran, 5-methyl-2-furaldehyde, 2-furaldehyde (furfural) (0-0.07 wt %), furantetrahydro-2,5-dimethoxy cis, furantetrahydro-2,5-dimethoxy trans, furfuryl alcohol (2-furan methanol) (0.15-0.16 wt %), 3-methyl-2(5H)-furanone (0.07-0.62 wt %), and 3-furan methanol.

Suitable phenols are phenol, o-cresol, p-cresol, m-cresol, 2-methyl-4-propylphenol, 3,4-dimethylphenol, 2,4-dimethylphenol, 2-ethylphenol, 3-ethyl phenol, hydroquinone, and 2,5-dimethylphenol.

Exemplary guaiacols are guaiacol, 4-acetoneguaiacol, 4-ethylguaiacol, 4-methylguaiacol, isoeugenol cis, isoeugenol trans, eugenol, and vanillin.

Syringols that are useful include syringol, syringaldehyde, acetosyringene, and 4-methylsyringol.

Amongst the alcohols typically present is methanol.

Suitable acids are formic acid, propianic acid, and acetic acid.

Exemplary sugars include levcglucosan.

Bio-oil is a dark-brown, mobile liquid derived from the thermo-chemical processing of biomass. Bio-oils generally contain water and lignin-derived oligomers. Lignin is a highly-available, well-studied bio-polymer known for its antioxidant properties. For asphalt pavements, oxidation can cause deterioration via long-term aging and eventually result in cracking. The present invention relates to lignin-containing bio-oil formulations as a substitute for asphalt binders, and optimization of the bio-oil formulation. Using bio-oil formulations as a substitute in asphalt production represents an economical alternative to conventional methods while being conscious of the environment and increasing the longevity and performance of asphalt pavements. As a pavement ages, it becomes stiffener and more susceptible to failure. In an embodiment of the present invention, polyethylenes were blended with different bio-oils to formulate asphalt substitutes. The use of bio-oil formulations as an asphalt substitute is an attractive way to increase the longevity and enhance the performance of pavements.

In an embodiment of the present invention, bio-oil formulated as an asphalt binder substitute can include asphalt additives. Suitable grades of asphalt additives include the following: PG52-22, PG58-22, PG64-22, PG67-22, PG70-22, PG76-22, PG82-22, PG52-28, PG58-28, PG64-28, PG67-28, PG70-28, PG76-28, PG52-34, PG58-34, PG64-34, PG64-16, PG67-16, PG70-16, PG76-16, PG64-10, PG67-10, PG70-10, PG76-10, pen grade 40-50, pen grade 60-70, pen grade 85-100, pen grade 120-150, AR4000, AR8000, AC10 grade, AC20 grade, and AC30 grade. F. Roberts et al., "Hot Mix Asphalt Materials, Mixture Design, and Construction," *NAPA Research and Education Foundation* (2nd ed.) (1996), which is hereby incorporated by reference in its entirety.

The bio-oil is preferably produced from a fast pyrolysis process of biomass, which consists of polymers of cellulose, hemicelluloses, and lignin. Examples include, but are not limited to oak wood, switch grass, and corn stover. Preferably, the bio-oil is recovered as fractions with distinct properties, including one or more fractions that are relatively low in water content, preferably less than about 8% by weight of the bio-oil, and has a lignin oligomer/poly phenol content in the range of about 30% to about 80% by weight. More preferably, the bio-oil has a water content of less than about 4% by weight, and most preferably from about 3% to about 4% by weight. More preferably, the bio-oil has a lignin oligomer/polyphenol content of from about 50% to about 60% by weight.

The bio-oil formulation includes a polymer additive, such as polyethylenes, oxidized polyethylenes, polyolefins, PE homopolymers, and the like. The polymer additive can include low molecular weight polymers, such as low, medium, or high density polyethylenes having a maximum viscosity of 1000 cps at 140° C. Other suitable polymers would include ethylenes and polypropylenes with melting points below 140° C. The polymer additive is preferably added at a concentration of up to about 8% by weight of the bio-oil. More preferably, the polymer additive is added at a concentration of from about 6% to about 8% by weight of the bio-oil. The polymer additive is added to the bio-oil at a temperature ranging from about 100° C. to about 130° C. utilizing mechanical agitation/mixing.

The bio-oil formulation binder preferably serves as a 100% replacement for the asphalt binder. The bio-oil formulation can be mixed with varying amounts of asphalt, for example, in amounts ranging from about 99% to about 1% bio-oil and from about 1% to about 99% asphalt. In a preferred embodiment, the bio-oil formulation binder includes from about 99% to about 40% by weight bio-oil, from 1% to about 8% by weight polymer additive, and optionally from about 0% to about 59% by weight asphalt additive.

In one embodiment, the bio-oil formulation binder can be mixed with water and a surfactant and mechanically agitated, in for example, a shear mill, to form an emulsion. Suitable emulsion-forming surfactants are known to those of skill in the art. The emulsified bio-oil binder can be used as weather-proofing sealant or as an adhesive bonding layer between two surfaces.

In another embodiment of the present invention, a composite material includes a mineral aggregate and a bio-oil formulation which binds the mineral aggregate at an air void content of from about 2% to about 28% according to procedures known to one of skill in the art. The bio-oil binder can be mixed with mineral aggregate typically composed of sand, gravel, limestone, crushed stone, and mixtures thereof. The composite material includes pavement material.

One form of the composite material is roofing shingles. The bio-oil binder containing the polymer additive is mixed with fiberglass and mineral aggregate typically composed of lime dust and/or granular ceramic material, such as manufactured ceramic material to form roofing shingles. The shingles can also include manufactured sand, e.g., crushed and washed mined aggregate, and also a blend of ceramic material and manufactured sand. The roofing shingles can also include modified asphalt containing a Fischer-Tropsch wax, polyethylene wax, and/or oxidized polyethylene wax.

In another embodiment, the present invention includes a method for the production of a bio-oil formulation wherein the polymer additive is combined with a pretreated bio-oil, heated to a temperature of from about 100° C. to about 130° C., and mixed until substantially homogeneous. Optionally, when forming an emulsion, water and a surfactant can be added to the homogeneous asphalt binder mixture. During pretreatment, the bio-oil can be blended in, for example, a shear mill for up to about 8 hours. Industrial processes such as use of an in line shear mill could produce analogous pretreatment of the bio-oil by mixing for less than a minute under the proper conditions. The mixture can be blended at about 500 rpm or more, preferably about 3000 rpm. A pretreatment procedure includes removing most of the water and the more volatile components through the combination of mechanical mixing at a temperature range of from about 100° C. to about 130° C. resulting in an increased viscosity but preferably less than about 3 Pascal seconds at a temperature range of from about 100° C. to about 130° C. with an aging index of preferably 12 or less when measured from about 2 hours to about 8 hours. The aging index is defined as:

$$\text{Aging Index} = \frac{\text{Viscosity of Aged Binder}}{\text{Viscosity of original Binder}}$$

In another embodiment of the present invention, the polymer additive is combined with pretreated bio-oil, heated to a temperature of from about 100° C. to about 130° C., and mixed in a shear mill to form a substantially homogeneous mixture.

The mixture has a viscosity of from about 100 to about 1000 cps when placed in a rotational viscometer and tested at about 20 rpm at a temperature of from about 100° C. to about 130° C. The homogenous material can be graded according to AASHTO MP3 and used as a substitute for asphalt binder in paving projects.

EXAMPLES

The present process includes converting the biomass (corn stovers, switchgrass, woods, or other carbohydrate material containing cellulosic, hemi-cellulosic, or lignin material) into liquid form from which so-called pyrolytic lignin can be separated by extraction using water. Fast pyrolysis of biomass produces bio-oil, gas, and char. The gas stream containing $H_2$, CO, $CO_2$, and hydrocarbons can be used to provide the heat required for the pyrolysis. Char that is produced can be burned to provide heat for the pyrolysis, returned to the soil to enhance soil fertility, or recovered for sale (as activated carbon). In one embodiment, developed at Iowa State University, the bio-oil produced was collected into five separate fractions using a combination of condensers and electrostatic precipitators as described in R. Williams et al., "Utilization of Fractionated Bio Oil in Asphalt," *Transportation Research Board* 88*th Annual Meeting*, p. 19 (2009), which is hereby incorporated by reference in its entirety. The separation of bio-oil into multiple fractions by using a fractionation system enables selection of bio-oil fractions that are optimal for use as an asphalt substitute, or to be extracted for their lignin portions. Of particular interest are the fractions originating from high molecular weight compounds. These leave the pyrolyzer as aerosols, which are captured by the ESPs (i.e. electrostatic precipitators).

Experiments producing bio-oil from the selected biomass materials were conducted by using a 25 kWt fast pyrolysis system developed at Iowa State University by the Center for Sustainable Environmental Technology (CSET). The pilot unit was composed of a 16.2 cm diameter fluidized bed reactor, a burner to externally heat the reactor, a two-stage auger to feed the solid, two cyclones to remove particulate matter, and a bio-oil collection system. The system can process 6-10 kg/h of solid feed. The multi-stage bio-oil collection system recovers bio-oil as distinct fractions referred to as "stage fractions." In this particular manifestation of the bio-oil recovery system, five stages were employed with the first four stages consisting of condensers and the last stage consisting of an electrostatic precipitator designed to collect aerosols suspended in the gas stream exiting the pyrolyzer. Other configurations of condensers and electrostatic precipitators have been subsequently built and tested but share in common with this original configuration the use of electrostatic precipitators to collect aerosols. The stage fraction from the recovery of these aerosols have proved particularly attractive in the production of bio-oil binder formulations.

In these examples, stage fractions of bio-oil recovered from the ESP stage of the bio-oil collection system was used. The so-called ESP fractions from the pyrolysis of corn stover, oak wood, and switch grass were each combined with polymer additives to optimize the bio-oil binders.

Example 1

The following example relates to the pretreatment procedure for varying the pretreatment temperature and duration of the pretreatment and its impact on the aging index as shown in FIGS. 1 through 4.

The following protocol/procedure was used to develop bio-binders from bio-oils and to investigate the applicability of using these developed bio-binders as pavement materials. The testing protocol/procedure can be summarized as follows.

Step 1: The viscosity of the virgin/untreated bio-oil is measured versus time at different temperatures. The suggested times are at 0, 0.5, 1, 2, 4 and 8 hours and the suggested temperatures are 100° C., 110° C., 120° C., and 130° C. The viscosity versus time at different temperatures is plotted and named as plot 1. The y-axis and the x-axis represent the viscosity and time, respectively. FIGS. 1 through 4, FIGS. 11 through 22, and FIGS. 29 through 34 are examples.

Step 2: the aging index at varying durations is measured using the following equation. The threshold value for the aging index for bitumen binders is preferably 12.

$$\text{Aging Index} = \frac{\text{Viscosity of Aged Binder}}{\text{Viscosity of original Binder}}$$

Step 3: the pre-treatment/upgrading procedure is determined based on steps 1 and 2. From plot 1, the pre-treatment duration is the point at which the slope of the viscosity-time relationship is changing. The pre-treatment temperature is determined based on the measured viscosity from between about 2 to about 8 hours. It is preferred to have viscosity of less than about 3 Pa·s and an aging index of less than the threshold value (i.e. 12) when measured after about 2 hours to about 8 hours. It is recommended to have a pre-treatment temperature higher than 100° C. to be sure that most of the volatile materials and water content be evaporated.

Step 4: the viscosity at different temperatures and shear rates is measured to determine the relationship between viscosity, and temperature and shear rate. The recommended temperature range is between 70° C. and 160° C. while the recommended shear rate range is between 20 and 100 rpm. The relationships between viscosity (y-axis) and temperature (x-axis) at the same shear rate (preferred to be 20 rpm) is plotted and named as plot 2. Examples are shown in FIGS. 5 through 10. The relationship between viscosity and temperature at Viscosity of Aged Binder for the same shear rate of the commonly used bitumen binders is included in this plot. The relationships between viscosity (y-axis) and shear rate at different temperatures (x-axis) is plotted and named as plot 3. Examples are shown in FIGS. 23 through 28.

Step 5: the pre-treated/upgraded bio-oil is blended with different types of polymer modifiers with different percentages. The relationship between viscosity and temperature for the modified bio-binders is measured and added to plot 2 and renamed as plot 3. Examples are shown in FIGS. 23 through 28. Based on plot 3, the bio-binder that resembles commonly used bitumen binders is preferred to be used. Otherwise, the bio-binder to be used as a pavement material is chosen based on pavement design criteria.

Step 6: the mixing and compaction temperatures for the bio-binder is determined based on plot 2 for step 4.

Step 7: the bio-binder undergoes RTFO and PAV aging in order to simulate in-situ aging during the mixing and compaction process (short term), and in-service period (long term). The RTFO procedure is modified to comply with the bio-binders properties. The recommended temperature for the RTFO is 110° C. to 120° C. The RTFO duration ranges between 10 minutes and 40 minutes and the recommended duration, based on this research, is 20 minutes. Using the DSR, the G*/sin (delta) values for 25-mm sample plates for the RTFO-aged bio-binders is determined at varying durations. Then, the RTFO indexes based on the following equation is calculated and compared to RTFO index of bitumen binders (2.2) in order to determine the appropriate RTFO duration. The PAV temperature may not be modified because it is in the range of 90° C. and 110° C.; however, the temperature of the degassing equipment is modified to comply with the properties of the bio-binders. The preferred degassing temperature based on this procedure is 120° C.

$$RTFO \text{ Index} = \frac{(G*/\text{sindelta})_{aged}}{(G*/\text{sindelta})_{unaged}}$$

Step 8: the amount of evaporation occurring due to RTFO aging is calculated based on the following equation. This step is considered in the process of designing the pavement mixture.

$$\text{Mass change} = \frac{\text{Aged mass} - \text{Original mass}}{\text{Original mass}} \times 100$$

Step 9: the performance grade is determined including the high, intermediate, and low temperature performance grade. The high temperature performance grade is determined based on the unaged and the RTFO-aged bio-binders using 25-mm samples in the DSR. The intermediate temperature performance grade is determined based on 8-mm samples on the DSR after the bio-binders undergo RTFO and PAV aging. The low temperature performance grade is determined after the bio-binders undergo RTFO and PAV aging using the BBR without changing or modifying the Superpave procedure.

Figure 35:
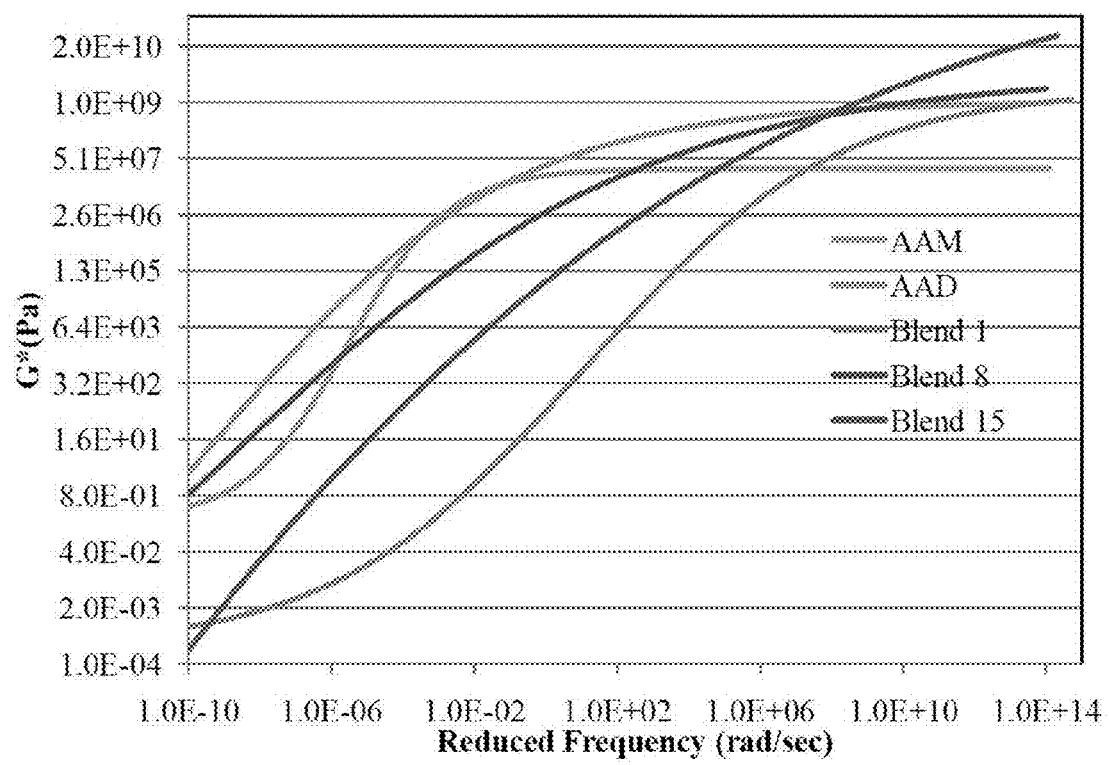
FIG. 35 is a Richards Curve plot.

Step 10: using Richard's curve, the master curve for the developed bio-binders is plotted and named as plot 4. The master curve for the bitumen binder is included in plot 4. FIG. 35 is an example. This plot shows the comparison between the overall behavior of the developed bio-binder and bitumen binders at different temperatures and frequencies. The following guidelines are preferably followed to construct the master curves for the bio-binders:

Rotational viscometer: conduct tests at four or five high temperatures (pre-treated/upgraded and unaged residues).

DSR: conduct tests using a 8 mm plate for two or three intermediate temperatures with different frequency sweeps (pre-treated/upgraded, and RTFO and PAV aged residues).

BBR: conduct tests at two or three low temperatures (pre-treated/upgraded, and RTFO and PAV aged residues).

Example 2

In this example, bio-oils were extracted from different biomass materials using an existing 25 k Wt fast pyrolysis system developed at Iowa State University by CSET. The different biomass feedstocks were oakwood, switchgrass, and cornstover. The pilot unit consists of a 16.2 cm diameter fluidized bed reactor, a burner to externally heat the reactor, a two-stage auger to feed the solid, two cyclones to remove particulate matter, and a vapor-condensing system consisting of four condensers and an electrostatic precipitator. The system can process 6-10 kg/h of solid feed.

The separation of bio-oils into multiple fractions was conducted using a fractionation condenser system which facilitated the selection of bio-oil fractions that would be optimal for being used as a pavement binder. As an example, Table 1 shows the properties of bio-oil fractions collected from fast pyrolysis of cornstover. It can be seen that those bio-oil fractions have significantly different properties, especially in water and pyrolytic lignin contents. Bio-oil fractions collected from condensers #1 and #2 and ESP have high pyrolytic lignin content and low water content, which make them most suitable for using as pavement binders.

TABLE 1

Properties of Bio-oils Fractions Collected from Fast Pyrolysis of Cornstover

| Property | Cond. 1 | Cond. 2 | Cond. 3 | Cond, 4 | ESP |
|---|---|---|---|---|---|
| Fraction of total oil (wt %) | 6 | 22 | 37 | 15 | 20 |
| pH | — | 3.5 | 2.7 | 2.5 | 3.3 |
| Viscosity @ 40° C. (cSt) | Solid | 149 | 2.2 | 2.6 | 543 |
| Lignin Content (wt %) | High | 32 | 5.0 | 2.6 | 50 |
| Water Content (wt %) | Low | 9.3 | 46 | 46 | 3.3 |
| C/H/O Molar Ratio | 1/1.2/0.5 | 1/1.6/0.6 | 1/2.5/2 | 1/2.5/1.5 | 1/1.5/0.5 |

The viscosity of bio-oils increases due to the aging effect. Temperature is the most driving variable that leads to the aging effect, and hence the viscosity of the bio-oils. In addition, some phase separation may also happen. As a result, instability problems may arise that are believed to result from a breakdown in the stabilized microemulsion and to chemical reactions, which continue to proceed in the bio oils.

The amount of aging that occurred in binder during production and in service can be quantified in terms of viscosity as the Aging Index "AI" as shown in Equation 2.5. This aging index has been employed to evaluate relative aging of asphalt cements of different grades and/or from different sources.

$$\text{Aging Index} = \frac{\text{Viscosity of Aged Binder}}{\text{Viscosity of original Binder}} \quad \text{Equation 2.5}$$

Example 3

In this example, three types of polyethylene (homopolymers) were used and their properties are summarized in Table 2. By definition, polyethylene "PE" is a polymer consisting of long chains of hydrocarbon molecules of the monomer ethylene and it is a grade from polyolefins. In addition, polyethylene is a thermoplastic commodity heavily used in consumer products. The ethylene molecule consists of $C_2H_4$, which are linked together by a double bond.

The three polymer modifiers used can be classified as thermoplastics according to the classification method aforementioned. These polymers were provided by Honeywell International, Inc.

TABLE 2

Properties of Polymer Modifiers Used

| Property | Polyethylene 617 | Oxidized Polyethylene 680 | Polyethylene 9 |
|---|---|---|---|
| Drop Point, Mettler (° C.) | 101 | 108 | 115 |
| Density (g/cc) | 0.91 | 0.93 | 0.93 |
| Viscosity @ 140° C. (cps) | 180 | 250 | 450 |
| Bulk Density (kg/m$^3$) | 563 | 536 | 508 |

The experimental matrix was designed to test all types of bio-oils with all three polymers modifiers at varying percentages. Each bio-oil was blended with each polymer modifier at two and four percent by weight. Table 3 shows the different bio-oils and polymer modifiers at different percentages.

TABLE 3

Experimental Matrix of Bio-oils with Polymer Modifiers

| Polymer Modifiers | Bio-oils | | |
|---|---|---|---|
| | Oakwood | Switchgrass | Cornstover |
| Polyethylene 617 | 0, 2, 4 | 0, 2, 4 | 0, 2, 4 |
| Oxidized Polyethylene 680 | 0, 2, 4 | 0, 2, 4 | 0, 2, 4 |
| Polyethylene 9 | 0, 2, 4 | 0, 2, 4 | 0, 2, 4 |

The amount of aging and oxidation was determined by measuring the aging index according to Equation 2.5. The aging index was calculated for the virgin bio-oils and the original bio-binders (after heat pre-treatment) by measuring the viscosity using the rotational viscometer for aged and unaged samples. For the virgin bio-oils, the aging index was determined by measuring the viscosity of the aged bio-oils at 2, 4, and 8 hours and comparing them to the viscosity of the unaged bio-oil (at 0 hours). Similarly, for the original bio-binders, the aging index was calculated by measuring the viscosity of the aged developed bio-binders at 1, 2, and 4 hours and comparing them to the viscosity of the unaged original bio-binder (at 0 hours).

The bio-oils tested had a high content of water and volatile materials. The pre-treatment/upgrading temperature was between 100° C. and 130° C., which is the temperature required for the evaporation of water. Importantly, the pre-treatment temperature should be below the decomposition temperature of the chemical constituents of bio-oils (cellulose, hemicellulose, and lignin). It was noted that the rates of change of viscosity over 8 hours were variable and the aging and hardening of bio-oils after two hours were high, so the pre-treatment duration should be less than two hours because developing a bio-binder, initially, having a high viscosity may lead to mixing and pavement performance problems. Notably, the viscosity of the bio-oils after two-hours of heating were below the viscosity specified by the Superpave at 140° C., which is 3 Pa·s. Therefore, the pre-treatment/upgrading duration is preferably a two-hour period.

Introduction to Superpave Specifications and Procedures

Superpave (Superior Performing Asphalt Pavements) is a product of SHRP asphalt research. The SHRP was established by Congress in 1987 to improve the performance and durability of United States roads and to make roads safer for both motorists and highway workers. SHRP research funds were used for the development of performance based asphalt specifications to directly relate laboratory analysis with field performance. The Superpave system incorporates performance based asphalt materials characterization with the design environmental conditions to improve performance by limiting the potential for the asphalt binder to contribute toward permanent deformation, low temperature cracking, and fatigue cracking in asphalt pavements.

One important distinction between typical asphalt specifications and the Superpave specifications is the overall format of the requirements. The required physical properties remain constant for all of the performance grades (PG). However, the temperatures at which these properties must be reached vary depending on the climate in which the binder is expected to be used. The Superpave tests measure physical properties that can be related directly to field performance by engineering principles. The Superpave binder tests are also conducted at temperatures that are encountered by in-service pavements. Table 4 lists the binder test equipment and a brief description of how each test is used in the Superpave specifications. Table 5 describes how each test provides some indication of binder performance; however, the pavement structure and mixture proportions will have additional bearing on this performance.

TABLE 4

Superpave Binder Test Equipment

| Equipment | Purpose |
|---|---|
| Rolling Thin Film Oven (RTFO) Pressure Aging Vessel (PAV) | Simulate binder aging (hardening) characteristics due to production and construction processes (RTFO) and in-situ conditions (PAV) |
| Dynamic Shear Rheometer (DSR) | Measure binder stiffness and elasticity properties at high and intermediate temperatures ($G^*$ and $\delta$) |
| Rotational Viscometer (RV) | Measure binder viscosity at high temperatures for selection of mixing and compaction temperatures |
| Bending Beam Rheometer (BBR) Direct Tension Tester (DTT) | Measure low temperatures stiffness and failure properties |

TABLE 5

Superpave Laboratory Tests and Relation to Performance

| Test Equipment | Performance Property | |
|---|---|---|
| Rotational Viscometer→ | Handling Pumping→ | Flow |
| Dynamic Shear Rheometer→ | Permanent Deformation→ | Rutting |
| | Fatigue Cracking→ | Structural Cracking |
| Bending Beam Rheometer→ Direct Tension Tester→ | Thermal Cracking→ | Low Temperature Cracking |

The main theme of the Superpave binder specifications is its reliance and dependence on testing asphalt binders in conditions that mimic the three critical stages during the binder's life. First, tests conducted on the original binder represent the first stage of transport, storage, and handling of the binder. Second, tests performed on the RTFO residue binder represent the second stage that the binder undergoes during mix production and construction. The second stage of tests is simulated for the specification by aging the binder in a rolling thin film oven (RTFO). Third, tests conducted on the pressure aging vessel (PAV) residue binder displays the third stage that the binder ages over a long period of time in-situ as part of the hot mix asphalt pavement layer; this stage is simulated by aging the RTFO residue binder in the PAV.

Testing Procedures and Concepts

The different testing procedures used in these examples include: rotational viscometer (RV"), blending and mixing of polymer modifiers, rolling thin film oven (RTFO), pressure aging vessel (PAy), dynamic shear rheometer (DSR), and bending beam rheometer (BBR).

Rotational Viscometer (RV)

This test was used to determine the flow characteristics of the virgin bio-oils (untreated) and the developed bio-binders (heat pre-treated bio-oils). The data acquired by rotational viscometer were used to determine the temperature and duration required for pre-treatment, to evaluate and quantify the amount of oxidation and aging that occurs, to measure the mixing and compaction temperatures at the hot mixing facility, and to determine the viscoelastic behavior of the developed bio-binders. The rotational viscometer was conducted by measuring the torque required to maintain a constant rotational speed of a cylindrical spindle at a specific temperature or measuring the torque at different rotational speeds at different temperatures. The torque applied is directly related to the binder viscosity.

The rotational viscometer procedure was varied based on the required data or measurement that was needed. In order to determine the pre-treatment temperature and duration and to evaluate and quantify the amount of oxidation and aging occurred, the following test was conducted in accordance to ASTM D 4402 (2006) and summarized as follows:

30 grams of bio-oil were heated in an oven until sufficiently fluid to pour.
The sample was stirred during heating to remove entrapped air.
8 or 11 grams were used typically according to the size of spindle.
The temperature was kept constant.
The motor was set to operate at 100 rpm.
The viscosity reading and the percent torque should be between 2 and 98%. If the percent torque was out of the range, the size of the spindle should be changed.
The five readings required for the report were: viscosity, test temperature, spindle number, speed and percent torque.
Three viscosity readings were recorded at 1-minute intervals and the reported value was the average of them.
The viscosity readings were recorded at 0, 30, 60, 120, 240, and 480 minutes at two different temperatures of 125° and 135° C.

In order to determine the mixing and compaction temperature of the developed bio-binders, the same aforementioned procedures were followed except that the viscosity readings of the developed bio-binder (pre-treated bio-oils) were recorded just after 15 minutes (from turning on the rotational viscometer) and at four different temperatures ranging from 70° C. to 145° C.

In order to determine the viscoelastic behavior of the bio-oils or the developed bio-binders, the following test was conducted in accordance to ASTM D 4402 (2006) and summarized as follows:

The motor was set to operate at different speeds; 5, 10, 20, 40, 80, and 100 rpm.
The temperature was kept constant during measuring viscosity of the developed bio-binder at different motor speeds.
The viscosity readings were recorded at 0, 30, 60, and 120 minutes.
The entire procedure was repeated for other temperatures ranging between 70° C. and 160° C. to study the effect of temperature on the viscoelastic properties of the developed bio-binders.

Rolling Thin Film Oven (RTFO)

The RTFO procedure served two purposes. The first was to provide an aged binder that can be used for further testing of physical properties. The second was to determine the mass quantity of volatiles lost from the developed bio-binder during the process. Volatile mass loss was an indication of the aging that may occur in the binder during mixing and construction operations. Therefore, the main objective of RTFO was to measure the effect of temperature and moving current of air on the properties of the semi-solid developed bio-binders.

The test was conducted in accordance to ASTM D 2872 (2004) and summarized as follows:

According to Superpave specifications and procedures, the aging temperature, originally, should be 163° C. and the aging duration should be 85 minutes. As the chemical structure of the original bio-binder may change due to this high temperature, these temperature and duration were modified. The temperature was adjusted and kept constant at 110° C. but the duration was changed accordingly. The G*/sin(delta) of the original binder calculated by the DSR should be at least 1.00 kPa and the G*/sin(delta) of the RTFO residue of the developed bio-binder calculated by the DSR should be at least 2.2 kPa. This means that the G*/sin(delta) had increased by about 120%. Therefore, the temperature of the RTFO was adjusted and kept constant at 110° C. and the durations were changed ranging between 60, 80, 100 and 120 minutes and the G*/sin(delta) were determined until the G*/sin(delta) values were increased by 120%. The duration at which the DSR value increased by 120% was considered the RTFO duration.
The RTFO oven was preheated to the aging temperature, 110° C., for a minimum of 16 hours prior to use.
The binder sample was heated until fluid, not exceeding 120° C.
Eight sample bottles were required for Superpave binder testing. Two samples (bottles) were required for the mass loss determination. The other six were used for further testing.
RTFO bottles were loaded with 50-60 grams of developed bio-binders.
The bottles were turned on their side to a horizontal position and placed in a cooling rack for 10, 20, and 30 minutes. Then, sample bottles were placed in the carriage and rotated at a rate of 15 revolutions per minute.
The air flow was set at a rate of 4000 ml/min for the calculated duration aforementioned. Then the weights of the bottles were measured to the nearest 0.001 gram.
Calculation of mass loss was determined according to the following equation:

$$\text{Mass change} = \frac{\text{Aged mass} - \text{Original mass}}{\text{Original mass}} \times 100$$

Pressure Aging Vessel (PAV)

The PAV exposed the developed bio-binder to high pressure and temperature for 20 hours to simulate the effects of long-term in-situ aging. According to H. Bahia et al., "Strategic Highway Research Program Binder Rheological Parameters: Background and Comparison with Conventional Properties," *Transportation Research Record,* 1488: 32-39 (1995), which is hereby incorporated by reference in its entirety, the PAV procedure simulates 5-10 years of in-service aging. Generally, the PAV aged bio-binders were used to test the intermediate critical temperature with the DSR. Since pavement binders exposed to long-term aging have also been through the mixing and construction process, the PAV procedure requires that the samples used should have been aged in the RTFO. In other words, PAV procedure was performed on RTFO residue developed bio-binder samples.

The test was conducted in accordance to ASTM D 6521 (2004) and summarized as follows:

The PAV procedure used developed bio-binder aged in the RTFO. The pressure vessel was designed to operate under the pressure and temperature conditions of the test (2070 kPa and either 90°, 100°, or 110° C.). The vessel must accommodate at least 10 sample pans. The oven should be able to control the internal temperature of the PAV to within ±0.5° C. during the aging period. In this procedure, the temperature was set to 100° C.

The RTFO-aged bio-binder was heated until fluid and stirred to ensure homogeneity.

Three PAV sample pans of 50 grams each were prepared and placed in the sample rack.

The sample rack with the samples was placed in the hot vessel and the lid was quickly secured to avoid excessive heat loss.

The aging process was conducted at different temperatures depending on the design climate.

When the vessel temperature was within 2° C. of the required temperature, the pressure was applied and the timing for the aging periods begun.

After 2.5 hours, the pressure was gradually released—8 to 10 minutes were usually required (if the pressure was released too quickly, foaming may occur).

The sample rack was then removed from the rack and placed in the oven at 100° C. (instead of 163° C. for bitumen binders) for 15 minutes. The temperature was set to 100° C. instead of 163° C. as the chemical structure of the bio-oils may change considerably at this high temperature.

The sample was then transferred to a storage container and degassed in a 120° C. (instead of 170° C. for bitumen binder) vacuum oven for 30 minutes at a pressure of 15 kPa absolute. The temperature was set to 120° C. instead of 170° C. due to the aforementioned reason.

PAV report included many readings that can be listed as follows: sample identification, aging test temperature to the nearest 0.5° C., maximum and minimum aging temperature recorded to the nearest 0.1° C., total time during aging that temperature was outside the specified range to the nearest 0.1 minute and total aging time in hours and minutes.

Dynamic Shear Rheometer (DSR)

Since pavement binder behavior depends on both temperature and loading time, the ideal test for binders should include both factors. Rheometers are adaptable for use in testing, so both time and temperature effects can be evaluated. The main objective of dynamic shear rheometer testing was to measure the rheological properties (shear modulus and phase angle) at intermediate to high temperatures using parallel plate geometry and was typically applicable to unaged and RTFO aged samples.

The test was conducted in accordance to ASTM D 7175 (2005) and summarized as follows:

The developed bio-binder binder was heated until fluid with stirring to remove air bubbles and achieve a homogeneous sample.

The bio-binder was poured into silicon mold with the appropriate diameter and thickness for testing (because lighter constituents of the binder may be absorbed by the silicone, care should be taken not to let the sample sit in the mold for any more than two hours before loading it in the DSR).

The bio-binder specimen should be attached to the plates of the DSR. Then, the DSR plate was lowered down automatically.

The specimen was trimmed flush with the parallel plates, and the extra 50 microns was "dialed out" so that the gap is exactly at the desired value.

The water was circulated through a temperature controller that precisely adjusted and maintained the desired sample temperature.

A computer controlled the DSR test parameters and recorded test results (testing consisted of setting the DSR to apply a constant oscillating stress and recording the resulting strain and time lag, $\delta$). The Superpave test procedures required that the oscillation speed to be 10 radians/second. The rheometer software automatically computed and reported $G^*$ and $\delta$, using the relationship between the applied stress and the resulting shear strain.

The operator set the approximate value of shear strain "strain amplitude". Original (unaged) binder and RTFO aged binders were tested at strain values of approximately ten to twelve percent. PAV-aged bio-binders were tested at strain values of about one percent. In all cases, strain values must be small enough that the response of the binder ($G^*$) remains in the linear viscoelastic range.

Bending Beam Rheometer (BBR)

The bending beam rheometer (BBR) was used to determine the low temperature performance grade of a pavement binder. A BBR tested the developed bio-binder at low service temperatures to determine its susceptibility to thermal cracking as pavement binder is very susceptible to thermal cracking at low temperatures due to the fact that bio-binders becomes less viscous as they are cooled and contracts. In other words, the BBR was used to measure how much a bio-binder deflected under a constant load at a constant temperature. The BBR tested pavement binders that had been aged in both a rolling thin film oven and the pressure aging vessel. Therefore, the test measured the performance characteristics of bio-binders as they had been exposed to hot mixing in a mixing facility and some in-service aging.

The test was conducted in accordance to ASTM D 6648 (200 1) and summarized as follows:

Test specimens were prepared using a rectangular aluminum mold. The inside surfaces of the two side plates and base plate were lightly greased with petroleum-based jelly. The mold was then assembled and held together with two rubber O-rings.

The developed bio-binder was heated until fluid (usually about 110° C., but not to exceed 120° C.) and poured into small, rectangular aluminum beams.

After a cooling period of about 45 to 60 minutes, excess binder was trimmed from the upper surface using a hot spatula. Then, the specimen remained in the mold at room temperature, but no longer than two hours.

The specimen was stored below −0.5° C. to allow for proper handling. The beams were placed in a fluid bath that maintained low temperatures.

After being in the fluid bath for one hour, the beams were individually placed on a loading frame and subjected to a load for 240 seconds.

The deflection was measured versus time, which was used to calculate the two key properties of stiffness and change in stiffness (m-value). A sample of bio-binder can fail at a given temperature by either having a stiffness value "5" of greater than 300 MPa or an m-value less than 0.300 (Asphalt Institute 2003).

Testing Sequence

The testing sequence of the rheological plan was conducted in subsequent stages. The first stage was concerned about measuring the viscosity of the virgin bio-oils with the rotational viscometer to determine the pre-treatment temperature and duration required. After the pre-treatment procedure, the second stage contained two tests, e.g. DSR and rotational viscometer, on the original bio-binder (developed bio-binder). Then the third stage was testing the RTFO bio-binder in the DSR after placing the bio-binder in the RTFO oven to simulate the short-term aging due to mixing and compaction processes. Finally, the RTFO bio-binder residue was placed in the PAV oven to simulate the long-term aging due to pavement performance, and then the PAV bio-binder was tested using DSR and BBR.

Determination of Rheological Properties

Pretreatment Temperature and Duration

The pretreatment temperature and duration were determined after testing the virgin bio-oils (with and without polymers modifiers) using the rotational viscometer. The viscosity of the virgin bio-oils was measured during 8 hours at different temperatures, e.g. 125° C. and 135° C. For instance, the virgin bio-oil was kept at 125° C. in the rotational viscometer for 8 hours and the viscosity values were measured at 0, 30, 60, 120, 240 and 480 minutes. The viscosity of the virgin bio-oils throughout the whole period was compared to the viscosity specified in the Superpave specifications and requirements, which is to be less than about 3 Pa·s. According to the relationship between viscosity and the duration, the pre-treatment temperature and duration were specified for each virgin bio-oil and polymer modifier virgin bio-oil.

Mixing and Compaction Temperatures

The mixing and compaction temperatures were calculated in accordance to the Superpave specifications and requirements. After the pretreatment procedure, the viscosity measurements of the original bio-binders at different temperatures, e.g. 70, 80, 90, 100, 110, and 120° C., were measured using the rotational viscometer. Then, determining the temperature range that corresponded to viscosity values of 0.17±0.02 Pa·s was the range of mixing temperature. Likely, determining the temperature range that corresponded to viscosity values of 0.28±0.03 Pa·s was the range of compaction temperature.

In this example, the pre-treatment procedure for developing bio-binders from bio-oils was determined for the three different bio-oils (oakwood, switchgrass, and cornstover). The pre-treatment procedure can also be referred to as an upgrading procedure. The pre-treatment/upgrading procedure was determined through measuring the viscosity of the bio-oils at different temperatures (125 and 135° C.) over 8 hours, then the aging indexes were calculated based on equation 2.5. The viscosity measurements were recorded using a Brookfield viscometer.

Viscosity Measurements and Aging Index before Treatment

The viscosity measurements for the tested bio-oils over the 8 hours at 125° C. and 135° C. without pre-treatment were measured. FIG. 5 to FIG. 7 and FIG. 8 to FIG. 10 display the viscosity over time for all the tested blends before treatment at 125° C. and 135° C., respectively.

Based on these figures, the following observations are noted. First, the viscosity of the unmodified oakwood, switchgrass, and cornstover bio-oils (blends 1, 8 and 15, respectively) were very low due to the presence of water and volatile materials. Besides, some viscosity measurements at the first two hours were almost zero due to the presence of water and volatile materials. Second, there was no considerable difference between the viscosity measurements of the three unmodified bio-oils. Third, the rates of change of viscosity over time for most of the blends were not constant. In other words, the rate of change of viscosity at the first two hours was different than the rate of change of viscosity between 2 and 8 hours. During the first two hours, a significant amount of evaporation and boiling took place due to the water and volatile materials. This may be the reason that the rate of change of viscosity during the first two hours was less than the rate of change of viscosity between 2 and 8 hours. Fourth, the addition of the polymer modifier led to a significant increase in the viscosity of the unmodified bio-oils.

The aging indices relative to zero and two hours were calculated and listed in Table 6 and Table 7 at 125 and 135° C., respectively. FIG. 11 to FIG. 13 and FIG. 14 to FIG. 16 display the aging indices at 125° C. for all the tested blends relative to zero and two hours, respectively. FIG. 17 to FIG. 19 and FIG. 20 to FIG. 22 represent the aging indices at 135° C. for all the tested blends relative to zero and two hours, respectively. Based on these values, the following conclusions could be made. First, the aging indices after four hours were below 12 (the threshold value of bitumen binders) for all blends at 125° C. and 135° C. (except blend 8 at 135° C.). In addition, the aging indices after 8 hours were ranging between 1.78 and 20.75 and 3.46 and 32.00 for 125° C. and 135° C., respectively. This indicated that increasing the temperature led to higher aging indices and this was expected as the temperature is a significant factor in increasing the oxidation occurring in the bio-oils. However, when the aging indices were determined relative to two hours, they were below 12 for all blends. Therefore, it can be concluded that if the bio-oils were pre-treated/upgraded, the aging indices of the bio-oils would decrease and become below the assumed limiting value (12) and would be comparable to bitumen binders. Second, the aging indices relative to zero after 8 hours for the unmodified bio-oils were—in general—higher than 12 which indicated that significant amount of oxidation took place in the bio-oils due to the high content of oxygen present in the bio-oils. Third, the addition of polymer modifiers did not lead to a decrease in the aging indices of the bio-oils. In other words, no specific trend could be noted in the aging indices after the addition of a polymer modifier. Overall, it may be concluded that a pre-treatment/upgrading procedure was required for the bio-oils to stabilize them through decreasing the water and volatile materials content and consequently decrease the aging indices.

TABLE 6

Aging Index Relative to Zero and Two Hours before Treatment at 125° C.

| Blend # | Aging Index relative to zero | | | | | Aging Index relative to two | |
|---|---|---|---|---|---|---|---|
| | 0.5 | 1 | 2 | 4 | 8 | 4 | 8 |
| 1 | 1.21 | 1.53 | 2.89 | 4.87 | 14.32 | 1.68 | 4.95 |
| 2 | 1.44 | 1.67 | 1.48 | 2.63 | 6.23 | 1.77 | 4.19 |
| 3 | 1.31 | 1.58 | 2.08 | 3.74 | 8.60 | 1.80 | 4.13 |
| 4 | 1.28 | 1.52 | 2.15 | 3.56 | 11.41 | 1.66 | 5.31 |
| 5 | 1.50 | 2.17 | 3.52 | 6.31 | 18.65 | 1.79 | 5.30 |
| 6 | 1.66 | 2.41 | 4.03 | 9.46 | 20.75 | 2.35 | 5.15 |
| 7 | 1.16 | 1.35 | 1.67 | 2.32 | 3.89 | 1.39 | 2.33 |
| 8 | 1.63 | 2.44 | 3.74 | 6.81 | 15.63 | 1.82 | 4.18 |

TABLE 6-continued

Aging Index Relative to Zero and Two
Hours before Treatment at 125° C.

| Blend | Aging Index relative to zero | | | | | Aging Index relative to two | |
|---|---|---|---|---|---|---|---|
| # | 0.5 | 1 | 2 | 4 | 8 | 4 | 8 |
| 9 | 1.09 | 1.29 | 1.83 | 2.93 | 5.90 | 1.60 | 3.23 |
| 10 | 1.23 | 1.47 | 2.10 | 3.71 | 7.94 | 1.76 | 3.77 |
| 11 | 1.13 | 1.32 | 1.70 | 3.02 | 6.04 | 1.78 | 3.56 |
| 12 | 1.08 | 1.24 | 1.61 | 2.16 | 3.31 | 1.35 | 2.06 |
| 13 | 1.08 | 1.24 | 1.67 | 2.55 | 5.42 | 1.53 | 3.24 |
| 14 | 1.07 | 1.26 | 1.82 | 2.87 | 5.13 | 1.58 | 2.82 |
| 15 | 1.25 | 1.58 | 1.93 | 2.70 | 4.25 | 1.40 | 2.21 |
| 16 | 1.25 | 1.58 | 2.10 | 3.07 | 5.98 | 1.46 | 2.84 |
| 17 | 1.20 | 1.54 | 2.00 | 3.05 | 5.38 | 1.53 | 2.69 |
| 18 | 1.15 | 1.38 | 1.62 | 2.26 | 3.20 | 1.40 | 1.98 |
| 19 | 1.19 | 1.31 | 1.63 | 2.10 | 3.10 | 1.29 | 1.91 |
| 20 | 1.00 | 1.17 | 1.42 | 2.08 | 3.12 | 1.47 | 2.20 |
| 21 | 1.04 | 1.08 | 1.12 | 1.16 | 1.78 | 1.04 | 1.59 |

TABLE 7

Aging Index Relative to Zero and Two
Hours before Treatment at 125° C.

| Blend | Aging Index relative to zero | | | | | Aging Index relative to two | |
|---|---|---|---|---|---|---|---|
| # | 0.5 | 1 | 2 | 4 | 8 | 4 | 8 |
| 1 | 1.76 | 3.08 | 4.89 | 10.84 | 30.84 | 2.22 | 6.30 |
| 2 | 1.34 | 1.51 | 1.87 | 3.58 | 8.80 | 1.91 | 4.70 |
| 3 | 1.57 | 2.17 | 3.80 | 7.11 | 16.80 | 1.87 | 4.42 |
| 4 | 1.67 | 2.25 | 3.75 | 9.05 | 26.25 | 2.41 | 6.99 |
| 5 | 1.44 | 1.90 | 2.97 | 5.69 | 11.95 | 1.91 | 4.02 |
| 6 | 2.13 | 2.54 | 3.58 | 5.56 | 9.54 | 1.55 | 2.67 |
| 7 | 1.09 | 1.18 | 1.33 | 1.61 | 2.39 | 1.22 | 1.80 |
| 8 | 4.33 | 5.67 | 8.33 | 15.78 | 32.00 | 1.89 | 3.84 |
| 9 | 1.39 | 1.84 | 2.88 | 5.82 | 12.63 | 2.02 | 4.38 |
| 10 | 0.83 | 1.01 | 1.59 | 3.50 | 11.54 | 2.20 | 7.28 |
| 11 | 1.32 | 1.76 | 2.64 | 5.06 | 16.27 | 1.92 | 6.18 |
| 12 | 1.09 | 1.45 | 2.04 | 4.02 | 9.83 | 1.97 | 4.81 |
| 13 | 1.10 | 1.26 | 1.82 | 3.85 | 10.00 | 2.12 | 5.50 |
| 14 | 0.90 | 1.14 | 1.56 | 3.22 | 9.05 | 2.06 | 5.78 |
| 15 | 1.27 | 1.61 | 2.12 | 3.18 | 5.39 | 1.50 | 2.54 |
| 16 | 1.16 | 1.37 | 2.03 | 4.12 | 8.37 | 2.03 | 4.13 |
| 17 | 1.12 | 1.31 | 1.91 | 3.48 | 10.58 | 1.83 | 5.55 |
| 18 | 1.09 | 1.28 | 1.60 | 2.26 | 3.58 | 1.41 | 2.24 |
| 19 | 1.25 | 1.50 | 1.83 | 2.47 | 4.00 | 1.35 | 2.18 |
| 20 | 1.50 | 2.00 | 2.43 | 4.27 | 7.33 | 1.75 | 3.01 |
| 21 | 1.20 | 1.40 | 1.66 | 2.26 | 3.46 | 1.36 | 2.08 |

Viscosity Measurements and Aging Index after Treatment

The viscosity measurements for the tested bio-oils over the 8 hours at 125° C. and 135° C. with pre-treatment were measured. FIG. 23 to FIG. 25 and FIG. 26 to FIG. 28 display the viscosity over time for all the tested blends after treatment at 125° C. and 135° C., respectively. Based on these figures, the following observations could be noted. First, the viscosity of the unmodified oakwood, switchgrass, and cornstover bio-oils (blends 1, 8 and 15, respectively) increased at 125° C. and 135° C. after treatment. This was expected as the treatment led to a decrease in the water and volatile materials contents. Second, no specific trend could be observed for the effect of treatment on the viscosity of the modified bio-oils at 125° C. and 135° C. Precisely, the treatment procedure did not lead—in general—to an increase in the viscosity of the modified bio-oils. This may be due to the effect of the blending procedure of the polymer modifiers (polymer additives) with the bio-oils which incorporated heating for 30 minutes at 110-120° C.; this blending procedure led to considerable variability in the viscosity of the modified bio-oils after treatment. Third, after treatment, the rates of change in viscosity over time for most of the blends were constant. In other words, the rate of change in viscosity at the first two hours was the same rate of change of viscosity between 2 and 8 hours. Fourth, during the first two hours, the amount of evaporation and boiling took place due to the water and volatile materials decreased due to the treatment procedure. Fifth, the addition of the polymer modifier did not led to a specific trend in the sense of increasing the viscosity of the unmodified bio-oils. In summary, it may be concluded that the treatment procedure was effective in increasing the viscosity of the unmodified bio-oils due to the evaporation of water and volatile materials and this at least in part lead to decrease the temperature susceptibility of the bio-binders developed from bio-oils.

The aging indices relative to zero hours were calculated and listed in Table 8 and Table 9 at 125° C. and 135° C., respectively. FIG. 29 to FIG. 31 and FIG. 32 to FIG. 34 represent the aging indices for all the tested blends relative to zero hours at 125° C. and 135° C., respectively. Based on these values, the following conclusions can be made. First, the aging indices relative to zero hours were decreased—in general—after treatment compared to the corresponding values of aging indices before treatment. This may be due to the increase in viscosity of the bio-oils associated with the treatment procedure due to the loss of water and volatile materials. Second, there was variability in the aging indices after the treatment, precisely the aging indices for some blends increased after treatment. However, this variability was expected due to the variability associated with the blending procedure of the polymer modifier, and with the bio-oils itself as a material.

TABLE 8

Aging Index Relative to Zero Hours after Treatment at 125° C.

| | Aging Index relative to zero | | | | |
|---|---|---|---|---|---|
| Blend # | 0.5 | 1 | 2 | 4 | 8 |
| 1 | 1.14 | 1.29 | 1.74 | 2.89 | 6.29 |
| 2 | 1.04 | 1.14 | 1.29 | 1.64 | 2.29 |
| 3 | 1.12 | 1.25 | 1.50 | 2.00 | 3.06 |
| 4 | 1.06 | 1.32 | 1.74 | 2.97 | 5.26 |
| 5 | 1.17 | 1.65 | 2.52 | 3.98 | 9.68 |
| 6 | 1.07 | 1.25 | 1.71 | 2.95 | 4.91 |
| 7 | 1.15 | 1.30 | 1.57 | 2.21 | 3.36 |
| 8 | 1.18 | 1.41 | 1.97 | 3.47 | 8.73 |
| 9 | 1.03 | 1.19 | 1.58 | 1.94 | 3.06 |
| 10 | 1.18 | 2.06 | 4.12 | 6.34 | 11.59 |
| 11 | 1.00 | 1.17 | 1.50 | 2.38 | 5.17 |
| 12 | 1.06 | 1.26 | 1.44 | 2.32 | 3.15 |
| 13 | 1.12 | 1.18 | 1.49 | 2.03 | 3.27 |
| 14 | 1.00 | 1.03 | 1.18 | 1.28 | 1.70 |
| 15 | 1.06 | 1.32 | 1.90 | 3.01 | 5.23 |
| 16 | 0.98 | 1.22 | 1.51 | 2.42 | 4.76 |
| 17 | 1.02 | 1.12 | 1.36 | 1.85 | 2.67 |
| 18 | 1.34 | 1.64 | 2.23 | 4.12 | 8.24 |
| 19 | 1.19 | 1.39 | 1.84 | 3.58 | 5.86 |
| 20 | 1.10 | 1.23 | 1.50 | 2.35 | 3.50 |
| 21 | 1.43 | 1.67 | 1.71 | 1.86 | 2.48 |

TABLE 9

Aging Index Relative to Zero Hours after Treatment at 135° C.

| Blend # | Aging Index relative to zero | | | | |
|---|---|---|---|---|---|
| | 0.5 | 1 | 2 | 4 | 8 |
| 1 | 1.15 | 1.27 | 1.73 | 3.08 | 8.65 |
| 2 | 1.05 | 1.15 | 1.39 | 1.79 | 2.73 |
| 3 | 1.00 | 1.00 | 1.13 | 1.46 | 2.05 |
| 4 | 1.22 | 1.39 | 1.66 | 2.26 | 3.66 |
| 5 | 1.14 | 1.34 | 1.91 | 4.53 | 18.25 |
| 6 | 1.12 | 1.26 | 1.55 | 2.16 | 5.25 |
| 7 | 1.21 | 1.69 | 2.66 | 3.41 | 5.55 |
| 8 | 1.37 | 1.71 | 2.47 | 3.66 | 15.85 |
| 9 | 1.18 | 1.41 | 1.85 | 2.98 | 5.06 |
| 10 | 1.14 | 1.37 | 1.75 | 4.07 | 10.85 |
| 11 | 1.36 | 1.73 | 2.41 | 3.55 | 6.69 |
| 12 | 1.30 | 1.57 | 2.00 | 3.09 | 5.00 |
| 13 | 1.16 | 1.32 | 2.08 | 2.76 | 5.12 |
| 14 | 1.25 | 1.63 | 1.81 | 2.63 | 4.56 |
| 15 | 1.44 | 1.78 | 2.51 | 4.11 | 8.02 |
| 16 | 1.22 | 1.49 | 2.21 | 3.71 | 9.71 |
| 17 | 1.37 | 1.65 | 2.05 | 3.12 | 5.19 |
| 18 | 1.42 | 2.09 | 3.17 | 5.66 | 15.08 |
| 19 | 1.26 | 1.68 | 2.44 | 5.33 | 12.03 |
| 20 | 1.19 | 1.34 | 1.63 | 2.28 | 3.80 |
| 21 | 1.16 | 1.38 | 1.69 | 2.48 | 3.94 |

Statistical Analysis

A statistical analysis was conducted, using the computer software JMP 7.0, to study the statistical difference between the viscosity over time and the aging indices of the bio-oils. A one-way analysis of variance "ANOVA" using the method of least squares was performed for evaluating the effect of heat treatment. Type I error (a) of 0.05 was used for all statistical analysis as the confidence level was 95%. The p-values of the AVOVA for the viscosity over time and aging indices for bio-oils were summarized and listed in Table 10 and Table 11, respectively. As shown below, the statistical tests were grouped according to the binder type and the temperature.

TABLE 10

Effect of Heat Treatment on the Viscosity over Time of Bio-oils

| Binder Type | Temp (° C.) | V0 | V0.5 | V1 | V2 | V4 | V8 |
|---|---|---|---|---|---|---|---|
| Oakwood | 125 | *0.0110*\* | *0.0207*\* | *0.0435*\* | 0.0677 | 0.1042 | 0.2393 |
| | 135 | *0.0588* | 0.1638 | 0.2071 | 0.2781 | 0.4048 | 0.4038 |
| Switchgrass | 125 | *0.0535* | *0.0506* | *0.0539* | *0.0622* | *0.0554* | *0.0515* |
| | 135 | *0.0541* | *0.0476*\* | *0.0458*\* | *0.0379*\* | *0.0349*\* | *0.0275*\* |
| Cornstover | 125 | 0.9779 | 0.9186 | 0.8641 | 0.8626 | 0.9436 | 0.9799 |
| | 135 | 0.8935 | 0.7520 | 0.6226 | 0.6375 | 0.6964 | 0.7666 |

Bold, italic,\*: statistically significant
Bold, italic: very close to statistically significant

TABLE 11

Effect of Heat Treatment on the Aging Index of Bio-oils

| Binder Type | Temp. (° C.) | AI0.5 | AI1 | AI2 | AI4 | AI8 |
|---|---|---|---|---|---|---|
| Oakwood | 125 | *0.0029*\* | *0.0185*\* | *0.0578* | 0.0620 | *0.0180*\* |
| | 135 | *0.0048*\* | *0.0088*\* | *0.0129*\* | *0.0154*\* | 0.0720 |
| Switchgrass | 125 | 0.2233 | 0.5255 | 0.7271 | 0.4937 | 0.3917 |
| | 135 | 0.5149 | 0.4518 | 0.3326 | 0.1447 | 0.0696 |
| Cornstover | 125 | 0.9398 | 0.9496 | 0.8526 | 0.3579 | 0.3875 |
| | 135 | 0.3387 | 0.3429 | 0.2082 | 0.2846 | 0.2859 |

Bold, italic,\*: statistically significant
Bold, italic: very close to statistically significant Based on these results, the following conclusions can be established. First, the effect of the heat treatment on the viscosity over time and aging indices were dependent on the type of the bio-oil. In other words, the viscosity over time and aging index for the bio-oils were not affected similarly due to heat treatment. From Table 10, the viscosity over time of the oakwood and switchgrass bio-oils was in general affected at 125° C. and 135° C., respectively. From Table 11, the aging index of the oakwood was the only bio-oil affected by the heat treatment. Second, no specific trend could be noted for the effect of the treatment on the viscosity over time and aging indexes of the bio-oils. This may be due to the low temperature (100-110° C.) of the treatment which led to evaporate the water content and the volatile materials without affecting the physical and chemical properties of the bio-oils. In addition, no clear trend was observed for the effect of heat treatment on viscosity due to the difference in temperature between the heat treatment (100-110° C.) and the temperature at which the viscosity was being measured (125° C. and 135° C.). Overall, the statistical analysis showed that the heat treatment procedure for the bio-oils had different effects on the viscosity over time and aging index and the degree of this effect was dependent on the type of the bio-oil. Also, the heat treatment procedure may not lead to significant changes in the physical and chemical properties of the bio-oils; however, the heat treatment procedure may be very important procedure to upgrade and stabilize the bio-oils through reducing the water and volatile materials content.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method for the production of an asphalt binder substitute comprising:
    a) pretreating a bio-oil by mechanical mixing at a temperature of from about 100° C. to about 130° C. such that the bio-oil achieves a water content of less than 8% and a viscosity of less than about 3 Pa·s at a temperature of from about 100° C. to about 130° C. and is equivalent to the bio-oil being mixed at a temperature of from about 100° C. to about 130° C. to achieve an aging index of less than about 12 after from about 2 to about 8 hours;
    b) adding a polymer additive to the pretreated bio-oil;
    c) heating the blend at a temperature of from about 100° C. to about 130° C.; and d) mixing the heated blend to produce an asphalt binder substitute with a viscosity between about 100 and about 1000 cps when measured in a rotational viscometer at about 20 rpm and a temperature of from about 100° C. to about 130° C.

2. The method of claim 1, wherein the bio-oil achieves a water content of less than 4% by weight.

3. The method of claim 1, wherein the bio-oil achieves a water content of 3-4% by weight.

4. The method of claim 1, wherein the asphalt binder substitute comprises the polymer additive at a concentration of from about 6% to about 8% by weight of the asphalt binder substitute.

5. The method of claim 1, wherein the asphalt binder substitute comprises up to about 8% by weight polymer additive.

6. The method of claim 1, wherein the polymer additive comprises a polyethylene, oxidized polyethylene, polyolefin, PE homopolymer, or mixtures thereof.

7. The method of claim 1, further comprising:
e) adding water and a surfactant to the asphalt binder substitute to form an emulsion.

8. The method of claim 7, wherein the asphalt binder substitute comprises a sealant or an adhesive.

9. The method of claim 1, wherein the bio-oil is produced from a fast pyrolysis process of a biomass.

10. The method of claim 9, wherein the biomass source of the bio-oil is a high lignin-content biomass.

11. The method of claim 10, wherein the biomass is oak wood, switch grass, or corn stover.

12. The method of claim 1, further comprising:
e) adding an additive that is asphalt to the asphalt binder substitute to produce an asphalt product.

13. The method of claim 12, wherein the asphalt product comprises the additive that is at a concentration of up to about 59% by weight of the asphalt binder substitute.

14. The method of claim 12, wherein the asphalt product includes from about 99% to about 40% by weight bio-oil, from 1% to about 8% by weight polymer additive, and optionally from about 0% to about 59% by weight additive that is asphalt.

* * * * *